United States Patent
Yoshida et al.

(10) Patent No.: US 9,156,475 B2
(45) Date of Patent: Oct. 13, 2015

(54) ACTUATOR CONTROL APPARATUS

(71) Applicant: DENSO CORPORATION, Kariya, Aichi-pref. (JP)

(72) Inventors: Kazuhiro Yoshida, Tokoname (JP); Jun Yamada, Nagoya (JP); Takuya Tamaru, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/265,452

(22) Filed: Apr. 30, 2014

(65) Prior Publication Data

US 2014/0336864 A1 Nov. 13, 2014

(30) Foreign Application Priority Data

| May 7, 2013 | (JP) | 2013-097923 |
| Jun. 28, 2013 | (JP) | 2013-137604 |
| Jul. 8, 2013 | (JP) | 2013-142263 |

(51) Int. Cl.
| *B60W 50/02* | (2012.01) |
| *F16H 61/12* | (2010.01) |
| *F16H 61/18* | (2006.01) |
| *B60W 50/04* | (2006.01) |
| *F16H 61/32* | (2006.01) |

(52) U.S. Cl.
CPC .......... *B60W 50/0205* (2013.01); *B60W 50/04* (2013.01); *B60W 2050/021* (2013.01); *B60W 2050/022* (2013.01); *F16H 2061/1268* (2013.01); *F16H 2061/326* (2013.01)

(58) Field of Classification Search
CPC .......... B60W 50/0205; B60W 50/045; B60W 2050/021; B60W 2050/022; F16H 2061/326; F16H 2061/126; F16H 2061/1268
See application file for complete search history.

(56) References Cited

U.S. PATENT DOCUMENTS 3,555,252 A * 1/1971 Garden ........................... 700/47
2003/0222617 A1 12/2003 Nakai et al.
(Continued)

FOREIGN PATENT DOCUMENTS

JP 2006-335157 * 12/2006

OTHER PUBLICATIONS

Office Action (3 pages) dated May 7, 2015 issued in corresponding Japanese Application No. 2013-142263 and English translation (4 pages).

(Continued)

*Primary Examiner* — Michael J Zanelli
(74) *Attorney, Agent, or Firm* — Nixon & Vanderhye P.C.

(57) ABSTRACT

An actuator control apparatus including a by-wire control circuit, a monitor circuit, a drive determination section, and a prohibition section is provided. The by-wire control circuit electrically controls an actuator acting as a drive source of an on-board apparatus. The monitor circuit monitors whether or not the by-wire control circuit is normally operating. The monitor circuit is provided separately from the by-wire control circuit. The drive determination section determines prohibition and permission of driving the actuator. The prohibition section prohibits the actuator from being driven when the permission of driving the actuator is not determined by the drive determination section. The prohibition section also prohibits the actuator from being driven when the monitor circuit determines that the by-wire control circuit is not normally operating.

15 Claims, 14 Drawing Sheets

(56) References Cited

U.S. PATENT DOCUMENTS

2006/0271260 A1 11/2006 Matsuzaki et al.
2010/0161187 A1* 6/2010 Ito .................................. 701/58
2010/0312424 A1* 12/2010 Yasui ............................. 701/22
2011/0112736 A1* 5/2011 Nakade et al. .................. 701/58

OTHER PUBLICATIONS

Office Action (2 pages) dated May 7, 2015 issued in corresponding Japanese Application No. 2013-137604 and English translation (3 pages).

* cited by examiner

ACTUATOR CONTROL APPARATUS

CROSS REFERENCE TO RELATED APPLICATION

The present application is based on Japanese Patent Applications No. 2013-97923 filed on May 7, 2013, No. 2013-137604 filed on Jun. 28, 2013, and No. 2013-142263 filed on Jul. 8, 2013, disclosures of which are incorporated herein by reference.

TECHNICAL FIELD

The present disclosure relates to an actuator control apparatus including a by-wire control circuit for electrically controlling an actuator, which is a drive source of a vehicle-mounted apparatus.

BACKGROUND

Recently, in order to meet requests for reducing space, improving assembling work and improving control ability in automobiles, mechanical drive systems are changed to by-wire systems in which an actuator such as a motor or the like is used for electrical driving.

Patent Document 1 (JP-2006-336691-A) describes this kind of by-wire systems, in which a monitor control circuit (e.g., engine control circuit) is provided separately from a by-wire control circuit electrically controlling the actuator. The monitor control circuit monitors the by-wire system based on predetermined monitoring information. When the monitor control circuit identifies abnormality of the by-wire system, the control of the actuator by the by-wire control circuit is prohibited (e.g., a switch is turned off to cut off the power supply to the actuator).

Patent Document 1: JP-2006-336691-A

However, in the technology of Patent Document 1, since the control of the actuator by the by-wire control circuit is prohibited only when the monitor control circuit identifies abnormality based on predetermined monitoring information, the actuator is in a controllable state before the monitor control circuit identifies the abnormality. Therefore, it is difficult to sufficiently improve safety in case of system abnormality (e.g., generation of abnormal signals due to noise or source voltage lowering).

SUMMARY

It is an object of the present disclosure to provide an actuator control apparatus that can improve safety in case of system abnormality in a system including a by-wire control circuit electrically controlling an actuator.

According to a first example of the present disclosure, an actuator control apparatus comprises a by-wire control circuit, a monitor circuit, a drive determination section, and a prohibition section. The by-wire control circuit electrically controls an actuator, which is a drive source of an on-board apparatus mounted to a vehicle. The monitor circuit monitors whether or not the by-wire control circuit is normally operating. The monitor circuit is provided separately from the by-wire control circuit. The drive determination section determines prohibition and permission of driving the actuator. The prohibition section prohibits the actuator from being driven when the permission of driving the actuator is not determined by the drive determination section. The prohibition section also prohibits the actuator from being driven when the monitor circuit determines that the by-wire control circuit is not normally operating.

According to the above actuator control apparatus, when the permission of driving the actuator is not determined by the drive determination section, the actuator is prohibited from being driven. Therefore, until the permission of driving the actuator is determined by the drive determination section, the prohibition of driving the actuator can be maintained even when the by-wire control circuit is normal. Furthermore, according to the above actuator control apparatus, when the monitor circuit determines that the by-wire control circuit is not normally operating, the actuator is prohibited from being driven. Therefore, if the monitor circuit determines that the by-wire control circuit is not normally operating, the actuator can be prohibited from being driven even when the drive determination section determines the permission of driving the actuator. Accordingly, the prohibition of driving the actuator can be achieved from both of (i) the drive determination section in a control circuit and (ii) the monitor circuit. Safety in case of system abnormality improves.

According to a second example of the present disclosure, an actuator control apparatus comprises a by-wire control circuit, a monitor circuit, a drive determination section and a prohibition section. The by-wire control circuit electrically controls an actuator, which is a drive source of an on-board apparatus mounted to a vehicle. The monitor circuit monitors whether or not the by-wire control circuit is normally operating. The monitor circuit is provided separately from the by-wire control circuit. The drive determination section determines prohibition of driving the actuator when speed of the vehicle is greater than a threshold. The drive determination section determines permission of driving the actuator when the speed of the vehicle is less than or equal to the threshold. The prohibition section prohibits the actuator from being driven when the permission of driving the actuator is not determined by the drive determination section. The prohibition section prohibits the actuator from being driven when the monitor circuit determines that the by-wire control circuit is not normally operating.

According to the above actuator control apparatus, when the permission of driving the actuator is not determined by the drive determination section, the actuator is prohibited from being driven. Therefore, until the permission of driving the actuator is determined by the drive determination section, the prohibition of driving the actuator can be maintained even when the by-wire control circuit is normal. Furthermore, according to the above actuator control apparatus, when the monitor circuit determines that the by-wire control circuit is not normally operating, the actuator is prohibited from being driven. Therefore, if the monitor circuit determines that the by-wire control circuit is not normally operating, the actuator can be prohibited from being driven even when the drive determination section determines the permission of driving the actuator. Accordingly, the prohibition of driving the actuator can be achieved from both of (i) the drive determination section in a control circuit and (ii) the monitor circuit. Safety in case of system abnormality improves. Furthermore, when the vehicle speed is greater than the threshold (e.g., when the vehicle speed is in a range in which malfunction may be generated due to driving the actuator), the drive determination section determines the prohibition of driving the actuator. When the speed of the vehicle is less than or equal to the threshold, the drive determination section determines the permission of driving the actuator. Therefore, it is possible to drive the actuator while ensuring safety when the vehicle speed is large and it is possible to drive the actuator in response to a vehicle driver's request in an improved response manner when the vehicle speed is small.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments will be described below.

First Embodiment

Figure 1:
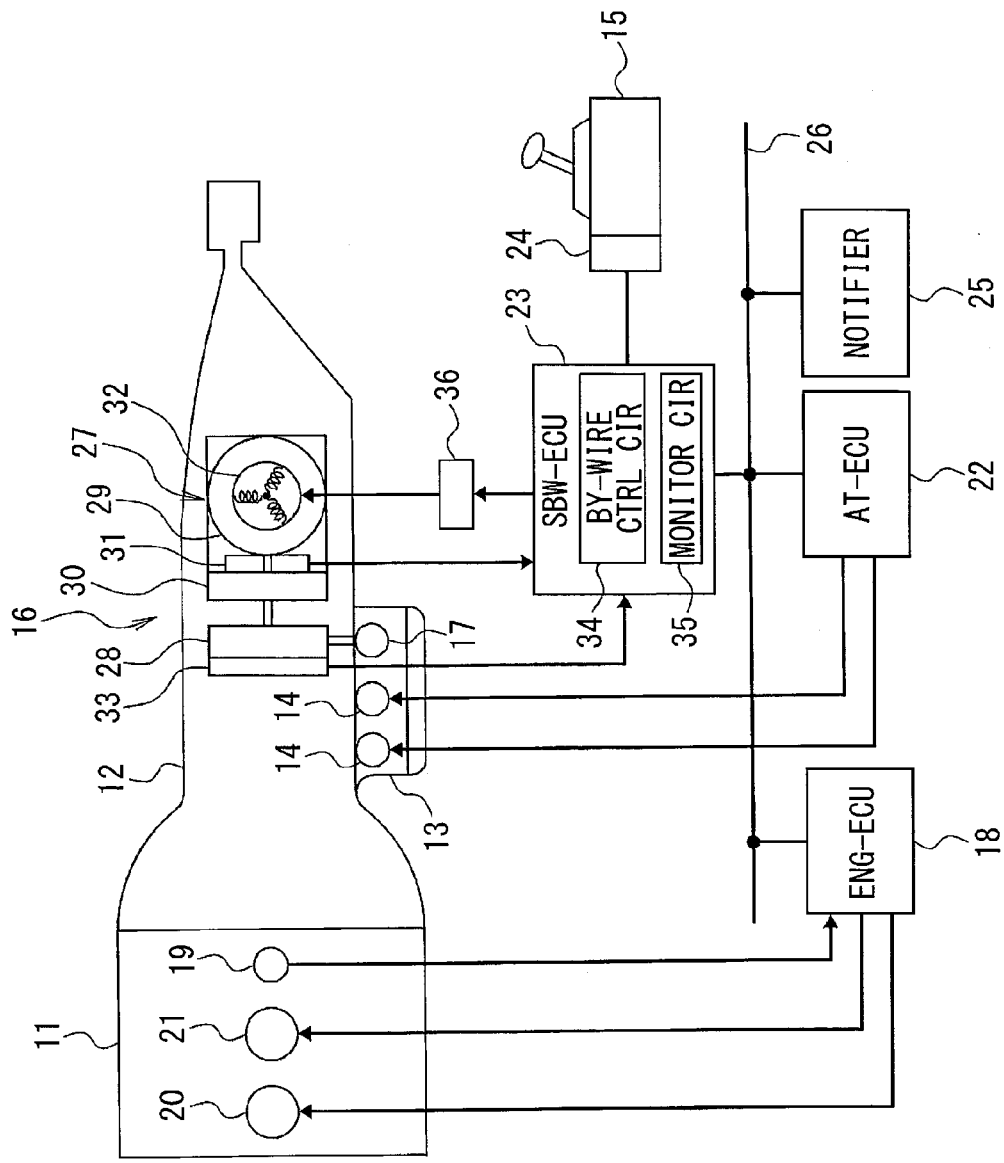
FIG. 1 is a diagram illustrating a schematic configuration of an automatic transmission control system of a first embodiment.

A first embodiment will be described based on FIGS. 1 to 4. FIG. 1 schematically illustrates a configuration of an automatic transmission control system. An output shaft (e.g., crankshaft) of an engine 11 is connected to an input shaft of an automatic transmission 12. The automatic transmission 12 includes a transmission gear mechanism (not shown), a friction engagement device (not shown), and an oil pressure control circuit 13. The friction engagement device switches over a combination of gears (e.g., gear ratio) for power transmission among multiple gears of the transmission gear mechanism. The oil pressure control circuit 13 switches over an operating state of the friction engagement device hydraulically. The oil pressure control circuit 13 includes an oil pressure control valve 14 and a manual value 17. The oil pressure control valve 14 controls oil pressure supplied to each friction engagement element of the friction engagement device such as a clutch, a brake or the like. The manual value 17 is switched over by a range switchover apparatus 16 in conjunction with an operation of a range selector 15. The range switchover apparatus 16 is an example of an on-board apparatus mounted to a vehicle.

An engine ECU 18 controls the engine 11. The engine ECU 18 controls a throttle opening of a throttle device 20 (e.g., an opening degree of a throttle value), a fuel injection amount of a fuel injection valve 21 or the like based on an output signal of an accelerator sensor 19 detecting accelerator position (e.g., an operation amount of accelerator pedal) or the like. In the present disclosure, the ECU refers to an electronic control unit.

An AT-ECU 22 controls gear shift of the automatic transmission 12. The AT-ECU 22 controls opening and closing of each oil pressure control valve 14 of the oil pressure control circuit 13 to control the oil pressure supplied to each friction engagement element, thereby switching over a gear ratio of the automatic transmission 12 into a target gear ratio.

A SBW-ECU 23 controls range switchover of the automatic transmission 12. By controlling the actuator 27 of the range switchover apparatus 16 based on an output signal of a selector sensor 24 detecting the range selected by the range selector 15, the SBW-ECU 23 controls switchover of the manual valve 17 in accordance with the range switchover operation of a vehicle driver and switches over the shift range of the automatic transmission 12. The range switchover apparatus 16, the SBW-ECU 23 etc. are included in a shift-by-wire system.

The engine ECU 18, the AT-ECU 22, the SBW-ECU 23, a notification device 25 etc. are connected via a communication line 26 (e.g., an in-vehicle LAN line or the like) to mutually exchange needed information.

The range switchover apparatus 16 switches over the shift range of the automatic transmission 12 among, for example, P range (parking range), R range (reverse range), N range (neutral range), and D range (drive range). The range switchover apparatus 16 includes the actuator 27 for driving the manual valve 17, the conversion mechanism 28, and the like. The actuator 27 includes an electric motor 29, a speed reducer mechanism 30, a rotation angel sensor 31, and the like. The electric motor 29 includes a driving portion 32 in which multiple coils arranged in a rotation direction are connected. In accordance with power supply to the driving portion 32, the electric motor 29 generates a rotational drive force at an output shaft. The speed reducer mechanism 30 increases the rotational drive force of the output shaft of the electric motor 29 and outputs the increased rotational drive force to the conversion mechanism 28. The conversion mechanism 28 converts the rotational drive force, which is outputted from the speed reducer mechanism 30, into a linear drive force to drive the manual valve 17. In the above, the shift range of the automatic transmission 12 can be controlled in accordance with a rotation angle of the electric motor 29.

The rotation angle sensor 31 includes, for example, a rotary-type encoder. The rotation angle sensor 31 detects a rotation angle of the electric motor 29 and outputs a detection signal to the SBW-ECU 23. As described above, since the shift range of the automatic transmission 12 is changed in accordance with the rotation angle of the electric motor 29, the rotation angle detected with the rotation angle sensor 31 indirectly represents the actual range of the automatic transmission 12.

Specifically, the electric motor 29 includes an encoder 31 as a rotational angle sensor for detecting rotation angle (e.g., rotation position) of a rotor. The encoder 31 is, for example, a magnetic rotary-type encoder. The encoder 31 outputs a pulse signal to the SBW-ECU 23 at every predetermined angle interval in synchronization with the rotation of the rotor of the electric motor 29. The SBW-ECU 23 counts the pulse signal of the encoder 31 to provide a count value (also referred to as encoder count value). The SBW-ECU 23 switches over a power supply phase in a predetermined sequence based on the encoder count value, thereby driving the electric motor 29. As described above, because the shift range of the automatic transmission 12 is changed based on the rotation angle of the electric motor 29, the encoder count value indirectly represents an actual range of the automatic transmission 12.

The range sensor 33 detects the actual range based on, for example, the rotation angle of the input shaft of the conversion mechanism 28, a position of the output shaft of conversion mechanism 28, a position of the manual valve 17, or the like. The range sensor 33 outputs a detection signal (also called an actual range signal) to the SBW-ECU 23. The selector sensor 24 detects a command value of the range selected by the vehicle driver with a range selector 15 and outputs a detection signal (also called a command angle signal) to the SBW-ECU 23. The range selector 15 may be a lever type range selector, a button type range selector, or the like. A vehicle speed sensor 42 outputs a vehicle speed signal indicating the vehicle speed to the SBW-ECU 23.

The SBW-ECU 23 includes a by-wire control circuit 34 and a monitor circuit 35 provided separately from the by-wire control circuit 34. The by-wire control circuit 34 electrically controls the actuator 27, which serves as a drive source of the range switchover apparatus 16. The monitor circuit 35 monitors whether the by-wire control circuit 34 is normally operating. The by-wire control circuit 34 is provided with a microcomputer or the like. The monitor circuit 35 is provided with an IC (e.g., ASIC) or the like. A drive prohibition device 36 for prohibiting the actuator 27 from being driven is provided between the SBW-ECU 23 and the actuator 27 of the range switchover apparatus 16 of the actuator 27. The drive prohibition device 36 can correspond to a prohibition section or means.

The by-wire control circuit 34 of the SBW-ECU 23 executes the below-described drive determination routine (illustrated in FIG. 3). Thereby, the SBW-ECU 23 determines permission and prohibition of driving the actuator 27. When the permission of driving the actuator 27 is not determined, the drive prohibition device 36 prohibits the actuator 27 from being driven. Additionally, the monitor circuit 35 of the SBW-ECU 23 executes the below-described monitoring routine (illustrated in FIG. 4). Thereby, the SBW-ECU 23 monitors whether or not the by-wire control circuit 34 is normally operating. When it is determined that the by-wire control circuit 34 is not normally operating, the drive prohibition device 36 prohibits the actuator 27 from being driven.

Figure 2:
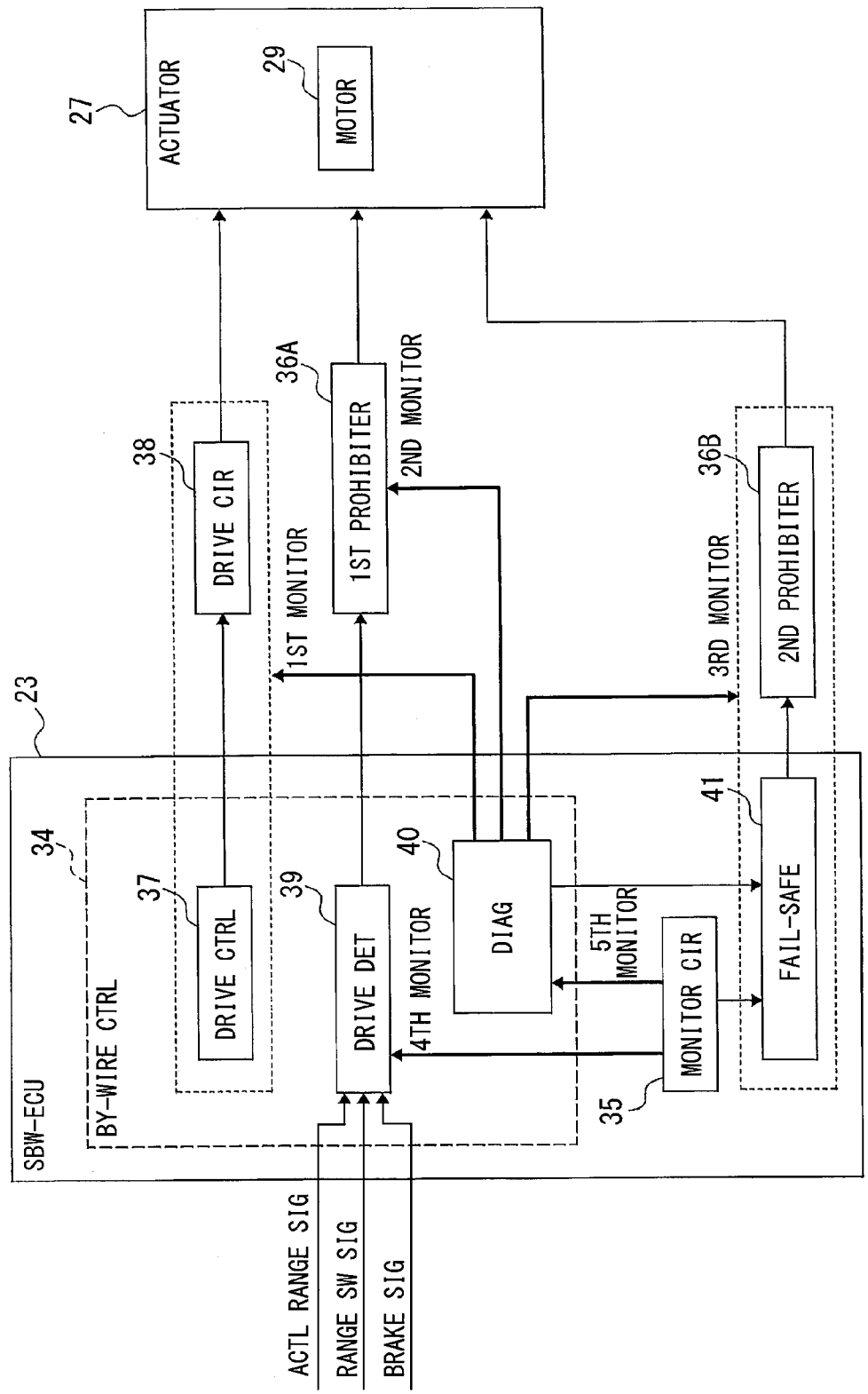
FIG. 2 is a block diagram for schematically explaining an actuator drive prohibition function of the first embodiment.

Specifically, as shown in FIG. 2, a drive control section 37 of the by-wire control circuit 34 of the SBW-ECU 23 controls the actuator 27 by controlling a drive circuit 38 controlling the power supply to the actuator 27. The drive determination section 39 (drive determination means) determines the permission and prohibition of driving the actuator 27 based on multiple signals representing a vehicle state. In the above, it is determined whether the following prohibition conditions (1) to (3) are met.

(1) The shift range is P range (e.g., the actual range signal indicates the P range).

(2) There is no request to switch over the shift range (e.g., the range switchover request signal is off).

(3) The brake is off (e.g., the brake signal is off).

When all the prohibition conditions (1) to (3) are met, the drive determination section 39 determines the prohibition of driving the actuator 27. If at least one of the three prohibition conditions (1) to (3) is not met, the drive determination section 39 determines the permission of driving the actuator 27.

When the drive determination section 39 determines the prohibition of driving the actuator 27 (i.e., the permission of driving the actuator 27 is not determined), the drive determination section 39 outputs a drive prohibition signal to a first drive prohibition device 36A of the drive prohibition device 36, so that the first drive prohibition device 36A prohibits the actuator 27 from being driven.

The first drive prohibition device 36A includes a relay, which cuts off the power supply to the actuator 27 (e.g., electric motor 29) when the drive prohibition signal is inputted from the drive determination section 39. Alternatively, the first drive prohibition device 36A may include a gate-off circuit, which places a gate of a MOSFET of the drive circuit 38 in an off state (e.g., places a gate voltage in a low level) when the drive prohibition signal is inputted from the drive determination section 39. In the above, the MOSFET is provided to control the power supply to the electric motor 29. Because the first drive prohibition device 36A includes hardware (e.g., the relay or the gate-off circuit) provided independently of the by-wire control circuit 34, the first drive prohibition device 36A is normally operable in case of failure of the by-wire control circuit 34.

When the drive determination section 39 determines the permission of driving the actuator 27, the drive determination section 39 outputs a drive permission signal to permit driving the actuator 27. In other words, the prohibition of driving the actuator 27 by the first drive prohibition device 36A is removed.

The by-wire control circuit 34 includes a diagnosis section 40 for performing a first monitoring process, a second monitoring process and a third monitoring process. In the first monitoring process, when the drive circuit 38 is in operation during satisfaction of all the three prohibition conditions (1) to (3), the diagnosis section 40 determines the presence of abnormality.

The diagnosis section 40 performs the second monitoring process in different ways depending on whether the first drive prohibition device 36A includes the relay or the gate-off circuit. In the case of the relay, when a terminal voltage of the electric motor 29 is a high level at a time of commanding the relay to be off, the diagnosis section 40 determines the presence of abnormality. In the case of the gate-off circuit, when the gate of the MOSFET is an off state at a time of commanding the gate of the MOSFET to be on, the diagnosis section 40 determines the presence of abnormality. Additionally or alternatively, when a terminal voltage of the electric motor 29 is a low level at a time of commanding the electric motor 29 to be on, the diagnosis section 40 determines the presence of abnormality.

The diagnosis section 40 performs the third monitoring process in different ways depending on whether below-described second drive prohibition device 36B includes a relay or a gate-off circuit. In the case of the relay, when a terminal voltage of the electric motor 29 is a high level at a time of commanding the relay to be off, the diagnosis section 40 determines the presence of abnormality. In the case of the gate-off circuit, when the gate of the MOSFET is off state at a time of commanding the gate of the MOSFET to be on, the diagnosis section 40 determines the presence of abnormality. Additionally or alternatively, when a terminal voltage of the electric motor 29 is a low level at a time of commanding the electric motor 29 to be on, the diagnosis section 40 determines the presence of abnormality.

When the diagnosis section 40 determines the presence of abnormality in at least one of the first, second and third monitoring processes, a fail-safe output section 41 outputs a fail-safe signal to a second drive prohibition device 36B of the drive prohibition device 36, so that the second drive prohibition device 36B prohibits the actuator 27 from being driven.

The second drive prohibition device 36B includes a relay, which cuts off the power supply to the actuator 27 (e.g., electric motor 29) when the fail-safe signal is inputted from the fail-safe output section 41. Alternatively, the second drive prohibition device 36B may include a gate-off circuit, which places a gate of a MOSFET of the drive circuit 38 in an off state when the fail-safe signal is inputted from the fail-safe output section 41. Because the second drive prohibition device 36B includes hardware (e.g., the relay or the gate-off circuit) provided independently of the by-wire control circuit 34, the second drive prohibition device 36B is normally operable in case of failure of the by-wire control circuit 34.

Furthermore, the monitor circuit 35, which is provided separately from the by-wire control circuit 34, performs fourth and fifth monitoring processes.

In the fourth monitoring process, the monitor circuit 35 performs abnormality diagnosis of the drive determination section 39 of the by-wire control circuit 34 such as ROM check, RAM check, FLOW check, INST check and the like. Thereby, the monitor circuit 35 monitors whether or not the drive determination section 39 of the by-wire control circuit 34 is normally operating.

In the fifth monitoring process, the monitor circuit 35 performs abnormality diagnosis of the diagnosis section 40 of the by-wire control circuit 34 such as ROM check, RAM check, FLOW check, INST check and the like. Thereby, the monitor circuit 35 monitors whether or not the diagnosis section 40 of the by-wire control circuit 34 is normally operating.

When the monitor circuit 35 determines that the drive determination section 39 of the by-wire control circuit 34 has abnormality (i.e., the drive determination section 39 is not normally operating) or when the monitor circuit 35 determines that the diagnosis section 40 of the by-wire control circuit 34 has abnormality (i.e., the diagnosis section 40 is not normally operating), the fail-safe output section 41 outputs a fail-safe signal to the second drive prohibition device 36B of the drive prohibition device 36, so that the second drive prohibition device 36B prohibits the actuator 27 from being driven.

In the following, the drive determination routine performed by the by-wire control circuit 34 of the SBW-ECU 23 will be described based on FIG. 3, and then, the monitoring process performed by the monitor circuit 35 of the by-wire control circuit 34 will be described based o FIG. 4.

(Drive Determination Routine)

Figure 3:
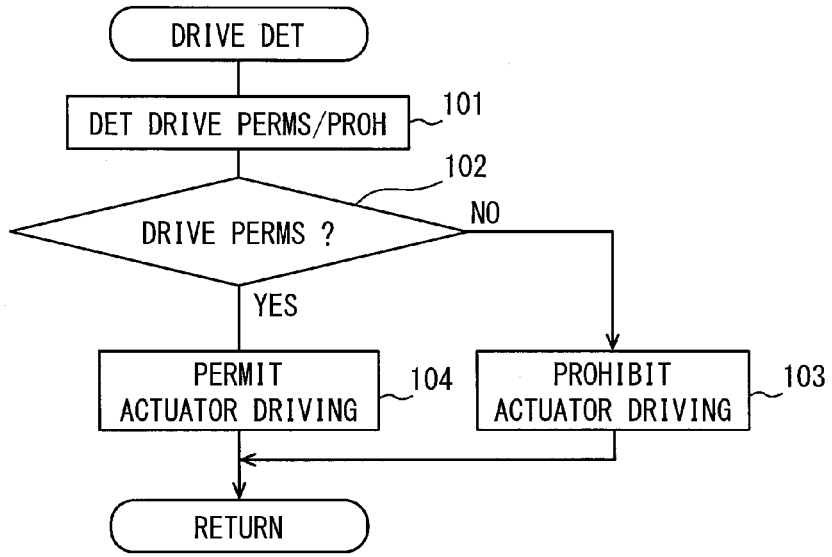
FIG. 3 is a flowchart illustrating a drive determination routine of the first embodiment.

During the power on of the SBW-ECU 23, the by-wire control circuit 34 of the SBW-ECU 23 repeatedly executes the drive determination routine illustrated in FIG. 3 at predetermined time intervals. When the drive determination routine starts, the by-wire control circuit 34 determines prohibition and permission of driving the actuator 27 at S101. To do so, the by-wire control circuit 34 makes a determination of, for example, whether or not the following prohibition conditions (1) to (3) are met.

(1) The shift range is P range (e.g., the actual range signal indicates the P range).

(2) There is no request to switch over the shift range (e.g., the range switchover request signal is off).

(3) The brake is off (e.g., the brake signal is off).

When all the prohibition conditions (1) to (3) are met, the by-wire control circuit 34 determines the prohibition of driving the actuator 27. If at least one of the three prohibition conditions (1) to (3) is not met, the by-wire control circuit 34 determines the permission of driving the actuator 27.

At S102, it is determined whether the permission of driving the actuator 27 is present based on a result of the determination made at S101.

When it is determined at S102 that the permission of driving the actuator 27 is not present (i.e., it is determined that the driving of the actuator 27 is prohibited), the process proceeds to S103. At S103, the first drive prohibition device 36A prohibits the actuator 27 from being driven.

When it is determined at S102 that the permission of driving the actuator 27 is present (i.e., the permission of driving the actuator 27 is determined), the process proceeds to S104. At S104, the by-wire control circuit 34 permits the driving of the actuator 27. That is, the prohibition of the driving of the actuator 27 by the first drive prohibition device 36A is removed.

(Monitoring Routine)

Figure 4:
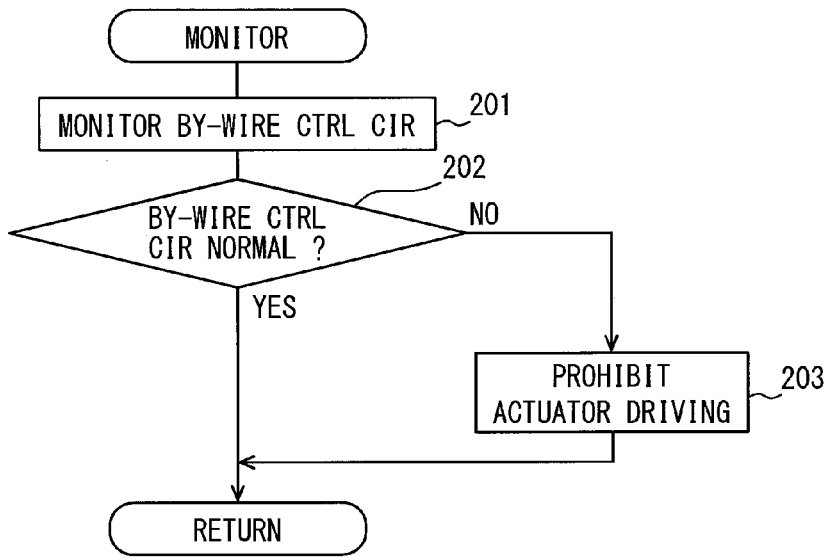
FIG. 4 is a flowchart illustrating a monitoring routine of the first embodiment.

During the power on of the SBW-ECU 23, the monitor circuit 35 of the SBW-ECU 23 repeatedly executes the monitoring routine illustrated in FIG. 4 at predetermined time intervals. When the monitoring routine starts, the monitor circuit 35 monitors whether the by-wire control circuit 34 is normally operating at S201. In the above, the monitor circuit 35 performs abnormality diagnosis of the drive determination section 39 of the by-wire control circuit 34 such as ROM check, RAM check, FLOW check, INST check and the like. Thereby, the monitor circuit 35 monitors whether or not the drive determination section 39 of the by-wire control circuit 34 is normally operating. Furthermore, the monitor circuit 35 performs abnormality diagnosis of the diagnosis section 40 of the by-wire control circuit 34 such as ROM check, RAM check, FLOW check, INST check and the like. Thereby, the monitor circuit 35 monitors whether or not the diagnosis section 40 of the by-wire control circuit 34 is normally operating.

At S202, the monitor circuit 35 determines whether or not the by-wire control circuit 34 is normal, based on a result of the determination at S201. Specifically, the monitor circuit 35 determines whether or not both of the drive determination section 39 and the diagnosis section 40 are normally operating.

When it is determined at S202 that the by-wire control circuit 34 is normal (i.e., both of the drive determination section 39 and the diagnosis section 40 are normally operating), this monitoring routine is ended.

When it is determined at S202 that the by-wire control circuit 34 is not normal (i.e., at least one of the drive determination section 39 and the diagnosis section 40 is not normally operating), the process proceeds to S203. At S203, the monitor circuit 35 instructs the second drive prohibition device 36B to prohibit the actuator 27 from being driven.

In the above illustrated first embodiment, the drive determination section 39 of the by-wire control circuit 34 determines the permission and prohibition of driving the actuator 27. When the permission of driving the actuator 27 is not determined (i.e., the prohibition of driving the actuator 27 is determined), the drive prohibition device 36 (specifically, the first drive prohibition device 36A) prohibits the actuator 27 from being driven. Additionally, the monitor circuit 35 provided separately from the by-wire control circuit 34 monitors whether the by-wire control circuit 34 is normally operating. When it is determined that the by-wire control circuit 34 is not normally operating, the drive prohibition device 36 (specifically, the second drive prohibition device 36B) prohibits the actuator 27 from being driven.

According to the above configuration, until the drive determination section 39 determines the permission of driving the actuator 27, the actuator 27 is prohibited from being driven even when the by-wire control circuit 34 is normal. Furthermore, if the monitor circuit 35 determines that the by-wire control circuit 34 is not normally operating, the actuator 27 is prohibited from being driven even when the drive determination section 39 determines the permission of driving the actuator 27. Accordingly, both of the by-wire control circuit 34 (specifically, the drive determination section 39) and the monitor circuit 35 can be used to prohibit the driving of the actuator 27. Therefore, unintentional switchover of shift range in case of system failure (e.g., generation of abnormal signals due to noise or source voltage decrease or the like) can be prevented. Safety improves.

Furthermore, in the first embodiment, the permission and prohibition of driving the actuator 27 is determined based on multiple signals such as, for example, the actual range signal, the range switchover request signal, the brake signal and the like. This can improve redundancy of determining the permission and prohibition of driving the actuator 27. Additionally, for each signal, it becomes unnecessary to provide redundant design. For example, it becomes unnecessary to provide dual system.

Furthermore, in the first embodiment, the drive prohibition device 36 including the first and second drive prohibition devices 36A, 36B is configured as hardware (e.g., relay or gate-off circuit) independent of the by-wire control circuit 34, so that even in case of failure of the by-wire control circuit 34, the drive prohibition device 36 is normally operable. Therefore, even in case of failure of the by-wire control circuit 34, the drive prohibition device 36 can normally operate to prohibit the actuator 27 from being driven.

Furthermore, in the first embodiment, a function of the drive determination section 39 is implemented in the by-wire control circuit 34 of the SBW-ECU 23. Therefore, in order to implement a technical idea of the present embodiment, the specification or the like of a control circuit (e.g., a control circuit of the engine ECU 18, a control circuit of the AT-ECU 22) different from the by-wire control circuit 34 is not necessary. In order to implement a technical idea of the present embodiment, it may be sufficient to change the specification or the like of the by-wire control circuit 34. Therefore, it is easily to implement a technical idea of the present embodiment.

Second Embodiment

A second embodiment will be described based on FIGS. 5 to 9. It is noted that explanation on substantially the same parts as in the first embodiment may be omitted or simplified, and explanation on parts different from the first embodiment will be mainly given below.

The encoder count value (i.e., the count value of the pulse signal of the encoder 31) is stored in the RAM (not shown) of the by-wire control circuit 34. Therefore, the stored encoder count value disappears when the SBW-ECU 23 is powered off. The encoder count value available at the time immediately after the power on of the SBW-ECU 23 does not correspond to the actual rotation position (power supply phase) of the electric motor 29. It is therefore necessary to match the encoder count value and the actual rotation position of the electric motor 29 after the power on in order to switch over the power supply phase in accordance with the encoder count value.

The by-wire control circuit 34 therefore performs initial driving process, which learns a relation between a power supply phase and an encoder count value of the electric motor 29 by initially driving the electric motor 29 after the power on, that is, after the by-wire control circuit 34 starts up. In this initial driving process (also called a power supply phase learning process), a switchover of the power supply phase of the electric motor 29 is attained one cycle sequentially in a predetermined time schedule in open-loop control so that a power supply phase and a rotation position of the electric motor 29 are matched in either one of power supply phases and the electric motor 29 is driven to rotate. The pulse signal of the encoder 31 is counted. A relation of correspondence among the encoder count value, the rotation position of the electric motor 29 and the power supply phase at a time of finish of the initial driving process is learned.

Based on the encoder count value after the startup of the electric motor 29, the by-wire control circuit 34 detects rotation (e.g., rotation angle) from the start position of the electric motor 29. Thus, the electric motor 29 cannot be precisely driven to a target position unless an absolute rotation position of the electric motor 29 is detected in some ways after the power on.

The by-wire control circuit 34 therefore preforms a reference position learning process after the finish of the initial driving process (e.g., after the power supply phase learning process). The reference position learning process includes a hitting control, in which the electric motor 29 is rotated until hitting a limit position of a movable range of the range switchover apparatus 16. The limit position is learned as the reference position. The encoder count value at the reference position is used as a reference when the rotation (rotation angle) of the electric motor 29 is controlled.

In the above, a P-range wall hitting control may be performed for example. In the P-range wall hitting control, the electric motor 29 is rotated until hitting a P-range wall, which is a P-range-side limit position of a movable range of the range switchover apparatus 16. After the P-range-side limit position is learned as the reference position, a P-range return process is performed to return to the P-range.

The power supply phase learning process and the reference position learning process can correspond to an initial learning process. When the vehicle driver's operation of the range selector 15 switches over the target range after the finish of the initial learning process (power supply phase learning process and reference position learning process), the by-wire control circuit 34 changes a target rotation position (e.g., target count value) in accordance with the target range and sequentially switches over the power supply phase of the electric motor 29 based on the encoder count value. Thereby, the by-wire control circuit 34 performs feedback control to drive the electric motor 29 to rotate the target rotation position and switches over the shift range into the target range.

Figure 6:
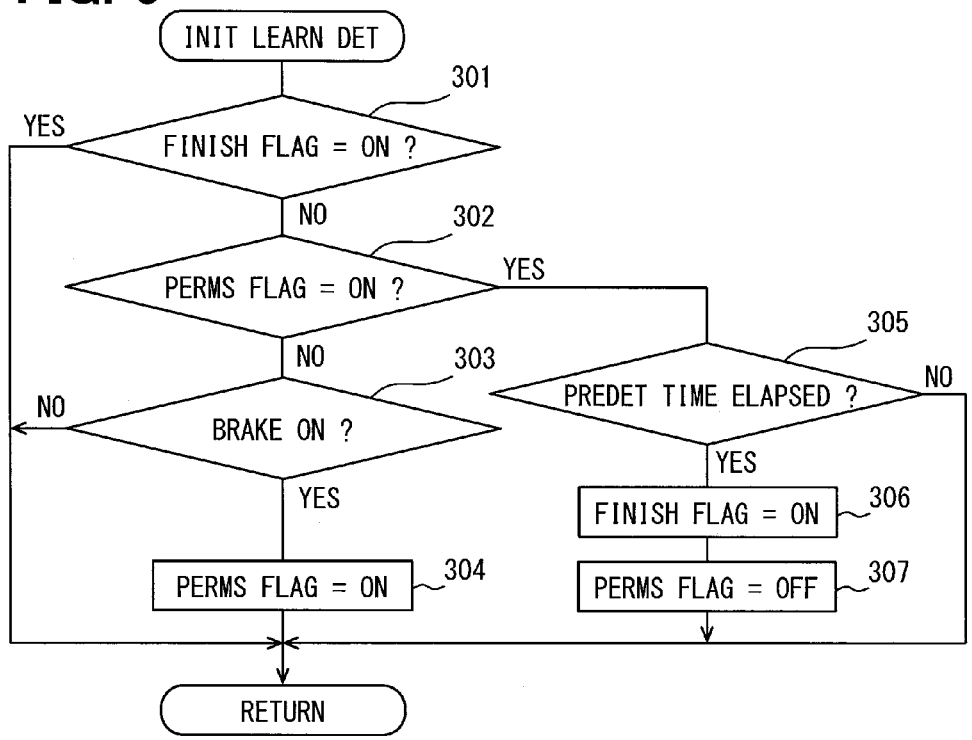
FIG. 6 is a flowchart illustrating an initial learning determination routine of the second embodiment.
Figure 7:
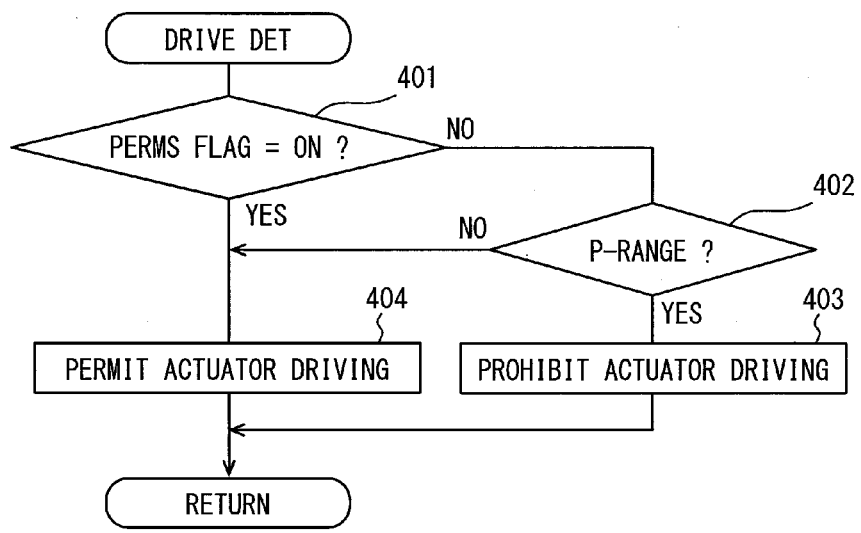
FIG. 7 is a flowchart illustrating a drive determination routine of the second embodiment.

In the second embodiment, in order to improve safety at a time of execution of the initial learning process (power supply phase learning process and reference position learning process), the by-wire control circuit 34 of the SBW-ECU 23 performs routines illustrated in FIG. 6 and FIG. 7. Thereby, the by-wire control circuit 34 permits the execution of the initial learning process when the brake is on (e.g., the brake is in operation). When the execution of the initial learning process is permitted, the by-wire control circuit 34 determines the permission of driving the actuator 27 (e.g., electric motor 29).

Figure 5:
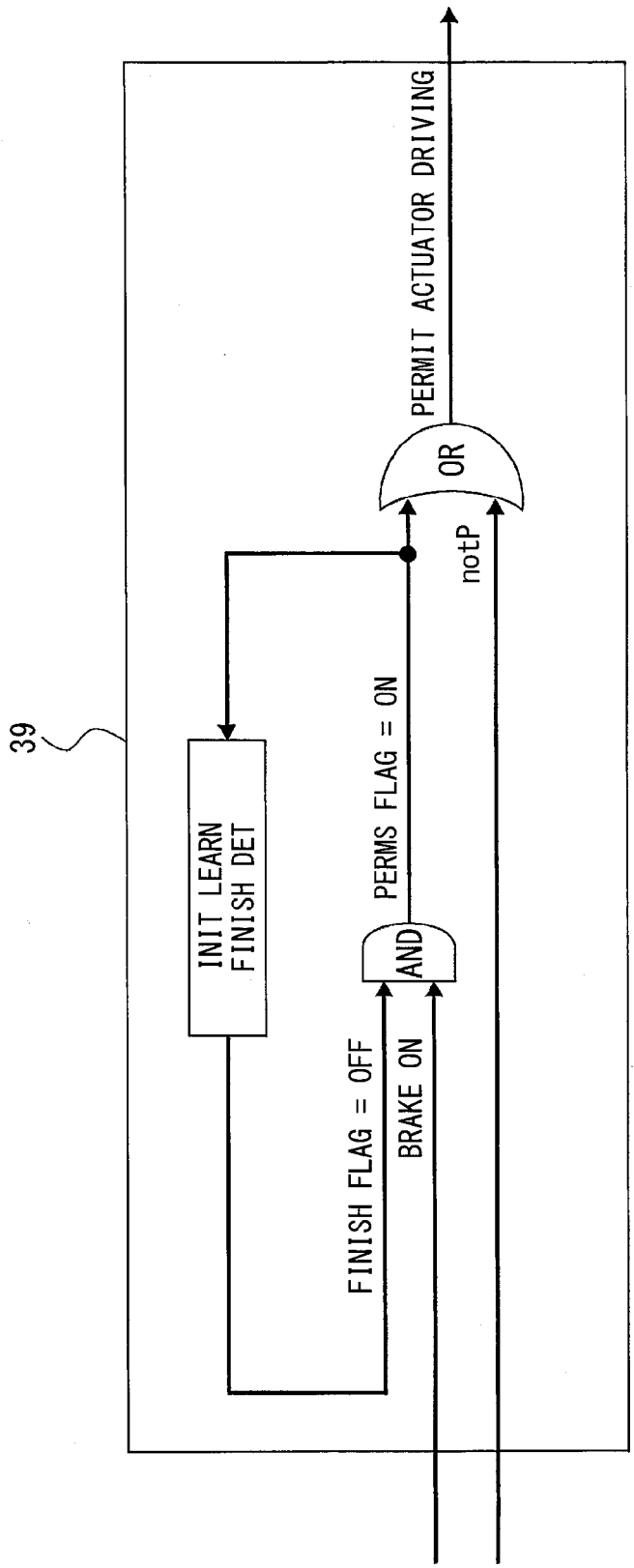
FIG. 5 is a diagram for schematically explaining a function of a drive determination section of a second embodiment.

Specifically, as shown in FIG. 5, the drive determination section 39 (see FIG. 2) of the by-wire control circuit 34 of the SBW-ECU 23 sets an initial learning permission flag to ON when an initial learning finish flag is OFF and the brake is ON. Then, when the initial learning permission flag is ON or when the shift range is not the P range (i.e., the shift range is other than the P range), the drive determination section 39 determines the permission of driving the actuator 27 (e.g., electric motor 29). When the initial learning permission flag is OFF and the shift range is the P range, the drive determination section 39 determines the prohibition of driving the actuator 27 (e.g., electric motor 29).

When the initial learning permission flag is set to ON, the initial learning permission flag is maintained at ON until the elapse of a predetermined time period since the initial learning permission flag was set to ON. The predetermined time period may be, for example, slightly longer than a time period required to finish the initial learning process. In this way, even if the brake becomes off during the execution of the initial learning process, the execution of the initial learning process is permitted at least until the finish of the initial learning process.

Thereafter, upon the elapse of the predetermined time period since the initial learning permission flag was set to ON, the initial learning finish flag is set to ON and the initial learning permission flag is reset to OFF. In this way, after the startup of the by-wire control circuit 34, the execution of the initial learning process is permitted only once.

The diagnosis section 40 (see FIG. 2) of the by-wire control circuit 34 performs the first, second and third monitoring processes. In the first monitoring process, the diagnosis section 40 determines the presence of abnormality when the drive circuit 38 is in operation during the off of the initial learning process permission flag (e.g., during the prohibition of driving the actuator 27). The second and third monitoring processes of the present embodiment are the same as those of the first embodiment. In the following, an initial learning determination routine performed by the by-wire control circuit 34 of the SBW-ECU 23 of the second embodiment will be described based on FIG. 6, and then, a drive determination routine performed by the monitor circuit 35 of the by-wire control circuit 34 of the second embodiment will be described based o FIG. 7.

(Initial Learning Determination Routine)

During the power on of the SBW-ECU 23, the by-wire control circuit 34 of the SBW-ECU 23 repeatedly executes the initial learning determination routine illustrated in FIG. 6 at predetermined time intervals. When the initial learning determination routine starts, the by-wire control circuit 34 determines at S301 whether an initial learning process finish flag is ON. The ON of the initial learning process finish flag indicates finish of the initial learning process. When it is determined that the initial learning process finish flag is ON, the process proceeds to S302. At S302, it is determined whether an initial learning process permission flag is ON. The ON of the initial learning process permission flag indicates the permission of the execution of the initial learning process.

When it is determined at S302 that the initial learning process permission flag is OFF, the process proceeds to S303. At S303, it is determined whether the brake is ON. When it is determined that the brake is ON, this initial learning determination routine is ended without execution of S304.

When it is determined at S303 that the brake is ON, the process proceeds to S304. At S304, the initial learning process permission flag is set to ON, and this initial learning determination routine is ended. In this way, when the brake is on, the initial learning process is permitted.

Thereafter, when it is determined at S302 that the initial learning process permission flag is ON, the process proceeds to S305. At S305, it is determined whether a predetermined time period has elapsed since the initial learning process permission flag was set to ON. The predetermined time period (e.g., 2 sec) is set slightly longer than a time period required to finish the initial learning process (the power supply phase learning process and the reference position learning process).

Thereafter, when it is determined at S305 that the predetermined time period has not elapsed since the initial learning process permission flag was set to ON, the by-wire control circuit 34 ends this initial learning determination routine while maintaining the OFF of the initial learning process finish flag and the ON of the initial learning process permission flag. In this way, even when the brake becomes off during the execution of the initial learning process, the execution of the initial learning process is permitted at least until the finish of the initial learning process.

Thereafter, when it is determined at S305 that the predetermined time period has elapsed since the initial learning process permission flag was set to ON, it is determined that the initial learning process has finished. In this case, the process proceeds to S306. At S306, the initial learning process finish flag is set to ON. Then, at S307, the initial learning process permission flag is reset to OFF and this initial learning determination routine is ended. Therefore, when it is determined at S301 that the initial learning process finish flag is ON, this initial learning determination routine is ended without execution of S302 and its subsequent steps. In this way, after the startup of the by-wire control circuit 34, the execution of the initial learning process is permitted only once.

(Drive Determination Routine)

During the power on of the SBW-ECU 23, the by-wire control circuit 34 of the SBW-ECU 23 repeatedly executes the drive determination routine illustrated in FIG. 7 at predetermined time intervals. When this routine starts, the by-wire control circuit 34 determines at S401 whether the initial learning process permission flag is ON. When it is determined that the initial learning process permission flag is ON, the process proceeds to S402. At S402, it is determined whether the shift range is P-range.

When it is determined at S401 that the initial learning process permission flag is OFF and it is determined at S402 that the shift range is P-range, the process proceeds to S403. At S403, the by-wire control circuit 34 determines the prohibition of driving the actuator 27 and instructs the first drive prohibition device 36A to prohibit the actuator 27 from being driven.

When it is determined at S401 that the initial learning process permission flag is ON or when it is determined at S402 that the shift range is not P-range (e.g., the shift range is other range than P-range), the process proceeds to S404. At S404, 3, the by-wire control circuit 34 determines the permission of driving the actuator 27 and permits the actuator 27 to be driven (e.g., the prohibition of driving the actuator 27 by the first drive prohibition device 36A is removed).

Figure 8:
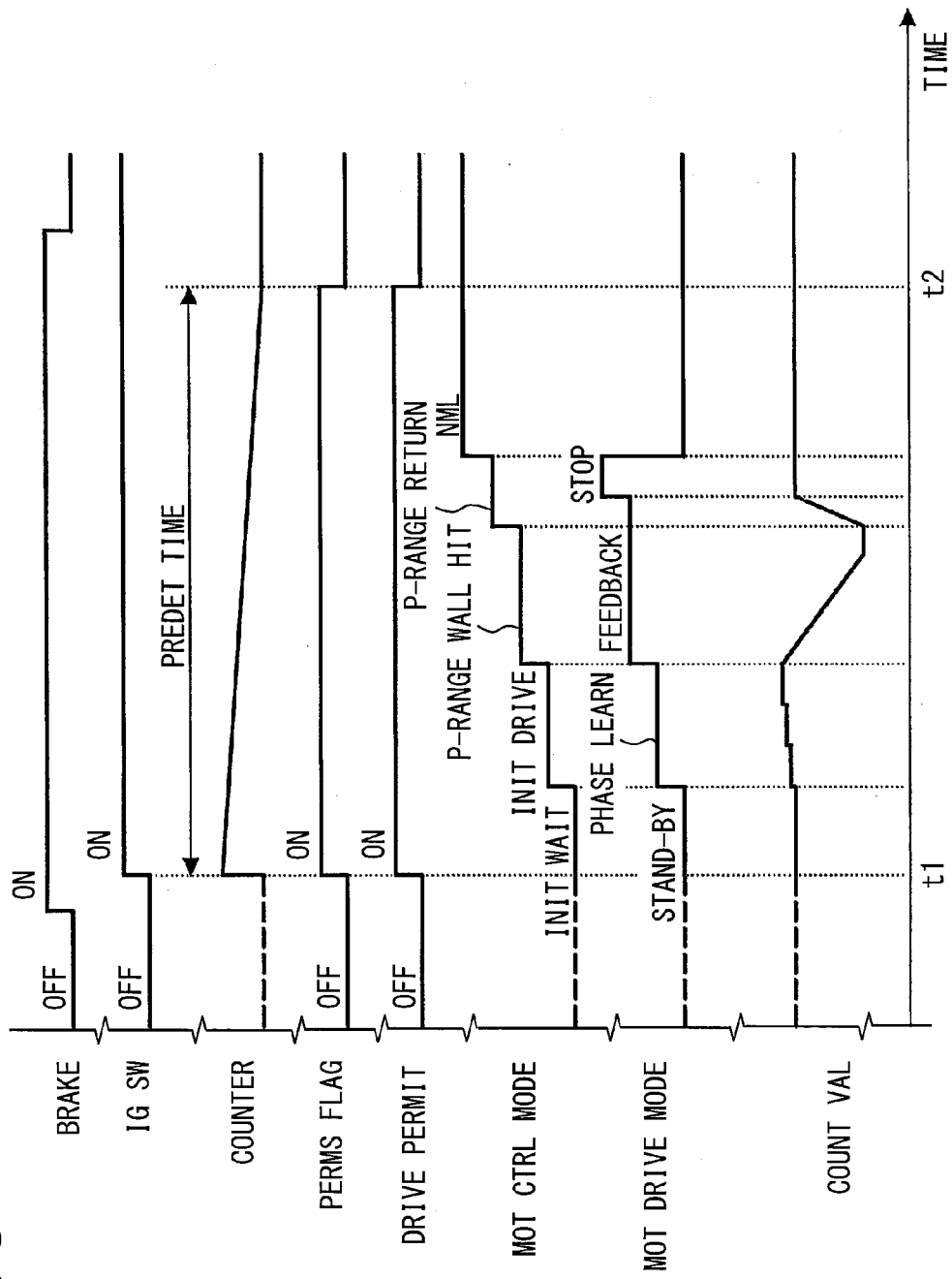
FIG. 8 is a timing chart illustrating a first example of execution of the initial learning determination of the second embodiment.
Figure 9:
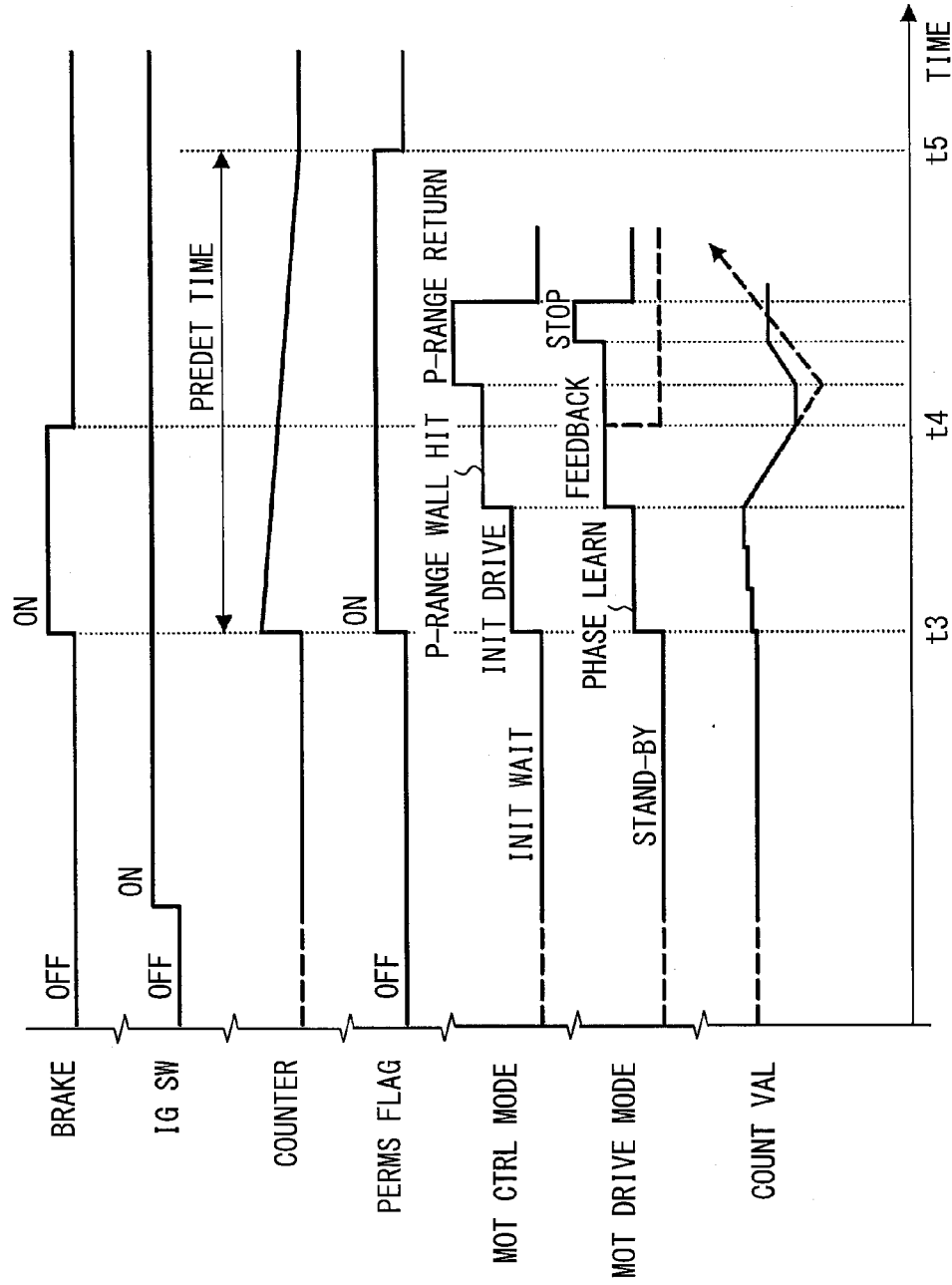
FIG. 9 is a timing chart illustrating a second example of execution of the initial learning determination of the second embodiment.

FIGS. 8 and 9 are timing charts showing examples of how the initial learning process determination is made. In FIG. 8, t1 is a time when the by-wire control circuit 34 starts up in response to the turn on of the IG (ignition) switch with the shift range being P-range. As shown in FIG. 8, when the brake is ON at t1, the initial learning process permission flag is set to ON. This permits the execution of the initial learning process. Additionally, the permission of driving the actuator 27 (e.g., electric motor 29) is determined. In this way, after the startup of the by-wire control circuit 34, the initial driving process and the power supply phase learning process are performed, and thereafter, the P-range wall hitting control and the reference position learning process are performed.

As described above, during the ON of the brake, the initial learning process (the power supply phase learning process and the reference position learning process) is permitted and performed. Therefore, if a system abnormality during the execution of the initial learning process resulting in for example, a switchover of the shift range from the P-range to another range, it is possible to prevent the vehicle from starting moving.

Thereafter, at a time t2 when the predetermined time period has elapsed since the initial learning process permission flag was set to ON, the initial learning process permission flag is reset to OFF, so that the initial learning process is permitted only once after the startup of the by-wire control circuit 34. In this way, the number of times the initial learning process is permitted after the startup of the by-wire control circuit 34 is minimized. Therefore, the possibility of occurrence of abnormality during the execution of the initial learning process is minimized.

In FIG. 9, the by-wire control circuit 34 starts up in response to the turn on of the IG (ignition) switch with the shift range being P-range. As shown in FIG. 8, when the brake becomes ON after the starts up of the e by-wire control circuit 34, the initial learning process permission flag is set to ON at a time t3. Note that t3 is a time when the brake becomes ON. In the above case, after the brake becomes ON after the starts up of the e by-wire control circuit 34, the initial driving process and the power supply phase learning process are performed, and thereafter, the P-range wall hitting control and the reference position learning process are performed.

FIG. 9 also illustrates a comparative example by the dashed-line. In the comparative example, the brake becomes OFF at t4 during the execution of the initial learning process (e.g., during the execution of the P-range wall hitting control). As illustrated in the comparative example, when the power supply to the actuator 27 (e.g., electric motor 29) is stopped at t4, there is a concern that the shift range may go out of the P-range after hitting the P-range wall due to the inertia of the electric motor 29.

By contrast to the comparative example, the second embodiment maintains the initial learning process permission flag at OFF until a time t4. The time t4 is a time at which the predetermined time period has elapsed since the initial learning process permission flag was set to ON. Thus, even if the brake becomes OFF during the execution of the initial learning process, the initial learning process is permitted until at least the finish of the initial learning process. According to the second embodiment, even if the brake becomes OFF during the execution of the initial learning process (e.g., during the execution of the P-range wall hitting control), it is possible to finish the initial learning process and prevent the shift range from going out of the P-range.

Third Embodiment

A third embodiment will be described based on FIG. 10. It is noted that explanation on substantially the same parts as in the first and second embodiments may be omitted or simplified, and explanation on parts different from the first and second embodiments will be mainly given below.

In some systems, a determination time period (i.e., a time period required for the fourth and fifth monitoring processes) of the monitor circuit 35 and/or a determination time period (i.e., a time period required for the first, second and third monitoring processes) of the diagnosis section 40 may relatively long. In such systems, if the prohibition of driving the actuator 27 by the first drive prohibition device 36A is removed immediately after the drive determination section 39 determines the removal of the prohibition of driving the actuator 27, there is a possibility of occurrence of the following difficulty. If malfunction of the drive determination section 39 removes the prohibition of driving the actuator 27, the prohibition of driving the actuator 27 by the first drive prohibition device 36A is removed before the prohibition of driving the actuator 27 by the second drive prohibition device 36B is removed by the diagnosis section 40 of the monitor circuit 35, and as a result, the actuator 27 temporarily becomes able to be driven.

Figure 10:
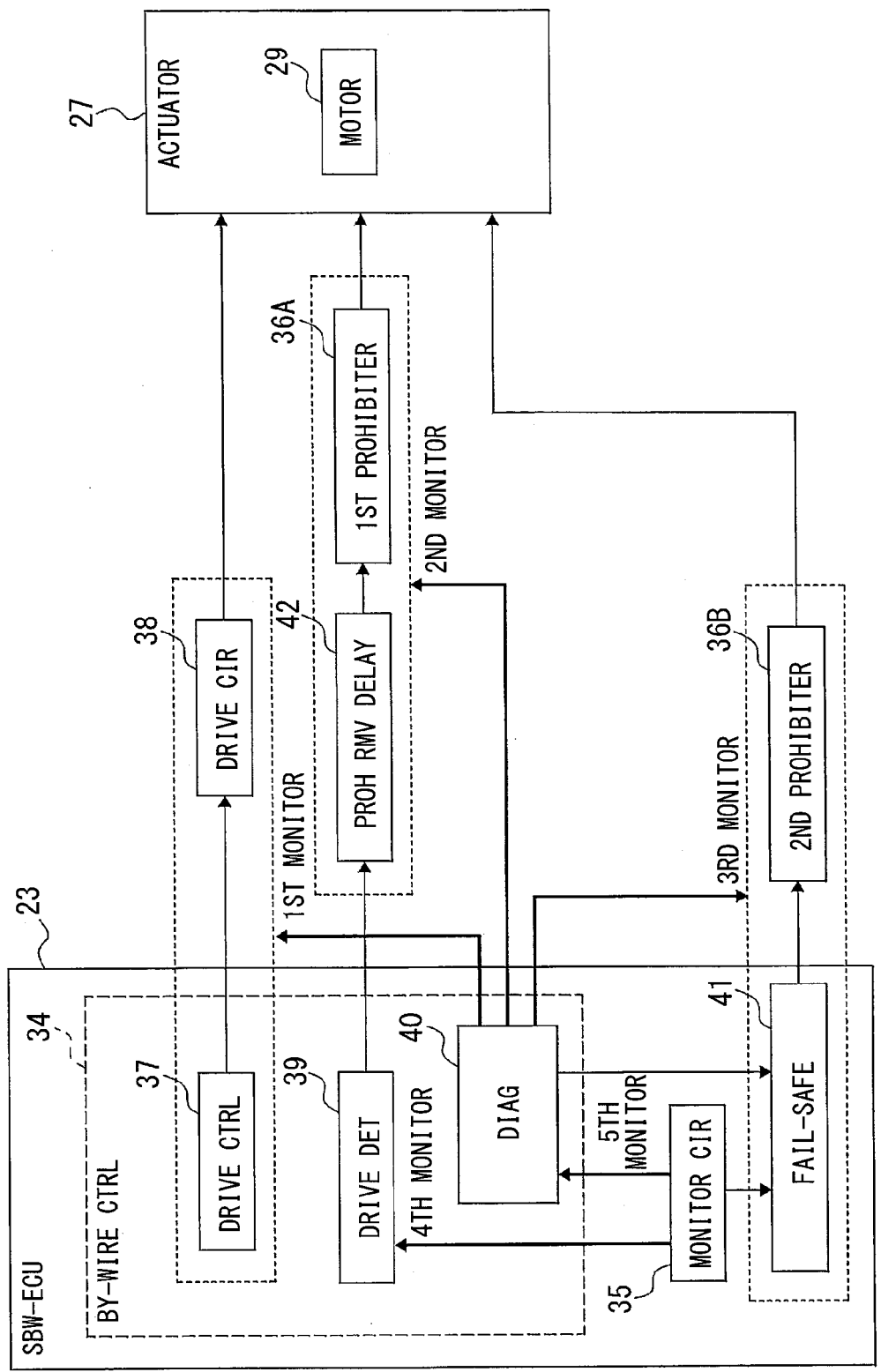
FIG. 10 is a block diagram for schematically explaining an actuator drive prohibition function of a third embodiment.

Therefore, as shown in FIG. 10, the third embodiment is provided with a prohibition removal delay section 42 (corresponding to prohibition removal delay means) that removes the first drive prohibition device 36A's prohibition of driving the actuator 27 after the elapse of a delay time period T since the drive determination section 39 determines the removal of the prohibition of driving the actuator 27.

The prohibition removal delay section 42 includes, for example, a counter or the like. After the elapse of the delay time period T since the prohibition removal delay section 42 received a drive permission signal from the drive determination section 39, the prohibition removal delay section 42 outputs its drive permission signal to the first drive prohibition device 36A. In this way, after the elapse of the delay time period T since the drive determination section 39 determines the removal of the prohibition of driving the actuator 27, the prohibition of driving the actuator 27 by the first drive prohibition device 36A is removed. The delay time period T is set slightly longer than a longer one of the determination time period of the monitor circuit 35 and the determination time period of the diagnosis section 40.

The above-illustrated third embodiment is provided with the prohibition removal delay section 42, by which the prohibition of driving the actuator 27 by the first drive prohibition device 36A is removed after the elapse of a predetermined time period since the drive determination section 39 determines the removal of the prohibition of driving the actuator 27. According to this configuration, even in the systems having the relatively longer determination time period of the monitor circuit 35 and/or the relatively longer determination time period of the diagnosis section 40, if malfunction of the drive determination section 39 removes the prohibition of driving the actuator 27, the second drive prohibition device 36B prohibits the actuator 27 from being driven within a time period before the elapse of the delay time period T based on the monitoring processes of the monitor circuit 35 and/or the diagnosis section 40. Therefore, the occurrence of the following difficulty is prevented. The difficulty is that the actuator 27 temporarily becomes able to be driven before the second drive prohibition device 36B prohibits, based on the monitor circuit 35 or the diagnosis section 40, the actuator 27 from being driven.

Fourth Embodiment

A fourth embodiment will be described based on FIG. 11. It is noted that explanation on substantially the same parts as in the first and second embodiments may be omitted or simplified, and explanation on parts different from the first and second embodiments will be mainly given below.

Figure 11:
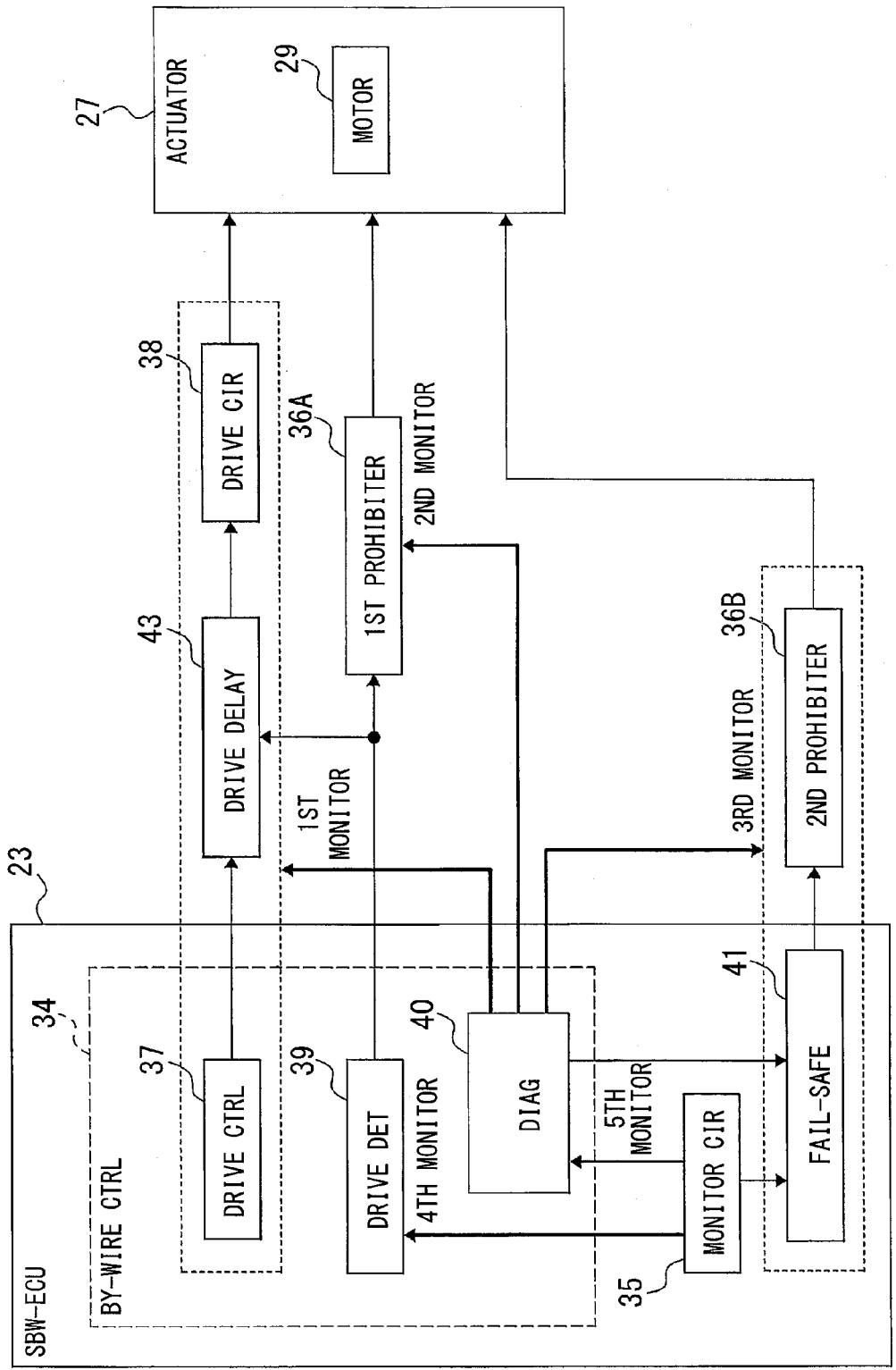
FIG. 11 is a block diagram for schematically explaining an actuator drive prohibition function of a fourth embodiment.

As shown in FIG. 11, the fourth embodiment is provided with a drivable delay section 43 (corresponding to drivable delay means) that places the actuator 27 in a drivable state after the elapse of a predetermined delay time period T since the drive determination section 39 removes the determination of the prohibition of driving the actuator 27. The drivable state of the actuator 27 is a state in which the actuator 27 is drivable.

The drivable delay section 43 includes, for example, a counter or the like. Before the elapse of the delay time period T since the drivable delay section 43 received a drive permission signal from the drive determination section 39, the drivable delay section 43 blocks a control signal, which is outputted from the drive control section 37, from being inputted to the drive circuit 38. After the elapse of the delay time period T, the drivable delay section 43 permits the control signal, which is outputted from the drive control section 37, to be inputted to the drive circuit 38. In this way, after the elapse of the delay time period T since the drive determination section 39 determines the removal of the prohibition of driving the actuator 27, the actuator 27 is placed in the drivable state. The predetermined time period T is set slightly longer than a longer one of the determination time period of the monitor circuit 35 and the determination time period of the diagnosis section 40.

The above-illustrated fourth embodiment is provided with the drivable delay section 43, which places the actuator 27 in the drivable state after the elapse of the predetermined delay time period since the drive determination section 39 removes the determination of the prohibition of driving the actuator 27. According to this configuration, even in the systems having the relatively longer determination time period of the monitor circuit 35 and/or the relatively longer determination time period of the diagnosis section 40, if malfunction of the drive determination section 39 removes the prohibition of driving the actuator 27, the second drive prohibition device 36B prohibits the actuator 27 from being driven within a time period before the elapse of the delay time period T based on the monitoring processes of the monitor circuit 35 and/or the diagnosis section 40. The time period before the elapse of the delay time period T is a time period before the actuator 27 is placed in the drivable state. Therefore, the occurrence of the following difficulty is prevented. The difficulty is that the actuator 27 is temporarily placed in the drivable state before the second drive prohibition device 36B prohibits, based on the monitor circuit 35 or the diagnosis section 40, the actuator 27 from being driven.

It is noted that the above-illustrated third and fourth embodiments is provided with only of the prohibition removal delay section 42 and the drivable delay section 43. Alternatively, other embodiments may be provided with both of the prohibition removal delay section 42 and the drivable delay section 43.

Fifth Embodiment

A fifth embodiment will be described based on FIG. 12. It is noted that explanation on substantially the same parts as in the first and second embodiments may be omitted or simplified, and explanation on parts different from the first and second embodiments will be mainly given below.

Figure 12:
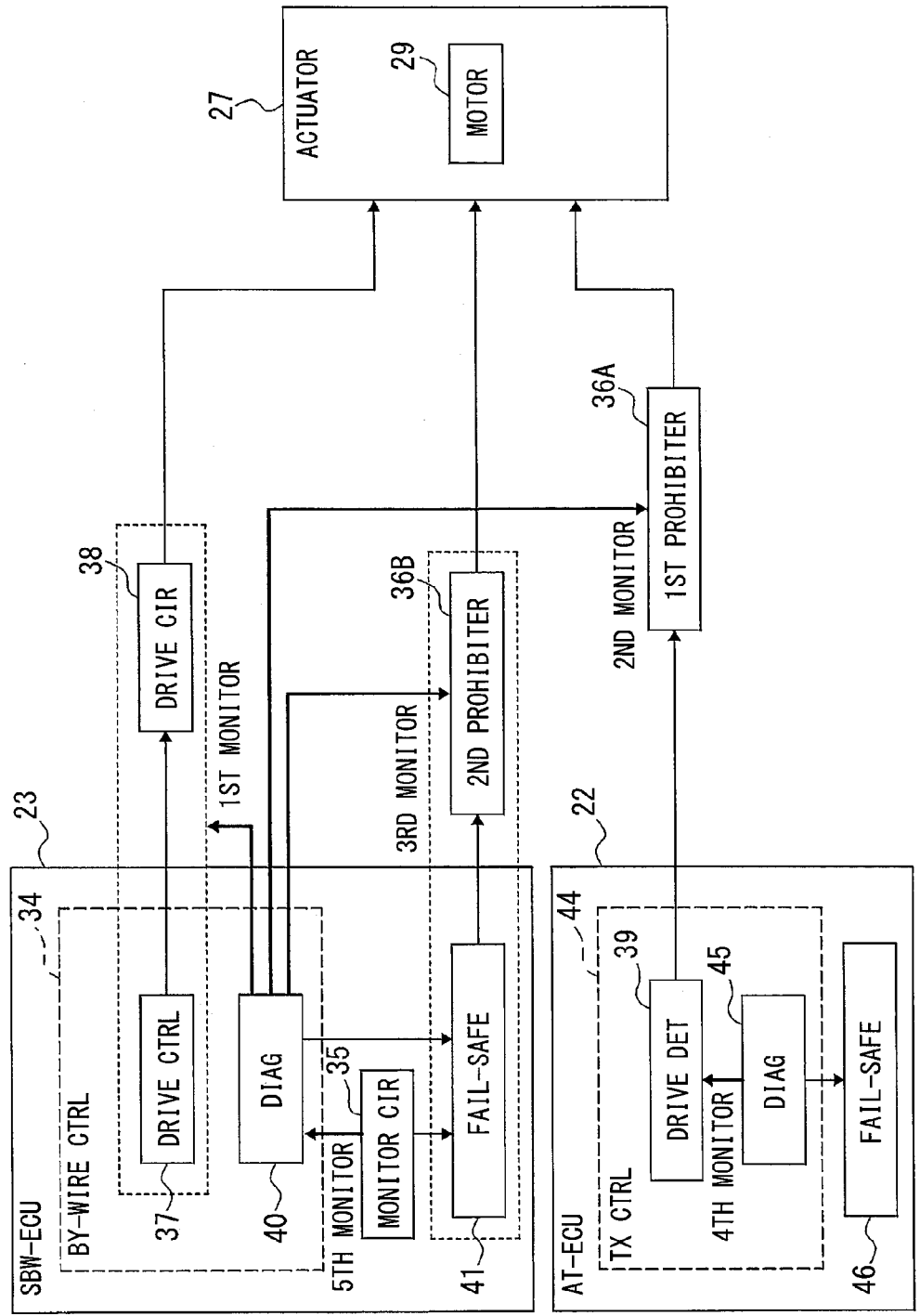
FIG. 12 is a block diagram for schematically explaining an actuator drive prohibition function of a fifth embodiment.

In the fifth embodiment, as shown in FIG. 12, a function of the drive determination section 39 is implemented in a control circuit that is provided separately from the by-wire control circuit 34 of the SBW-ECU 23. Specifically, a function of the drive determination section 39 is implemented in a transmission control circuit 44 of the AT-ECU 22. The drive determination section 39 of the transmission control circuit 44 of the AT-ECU 22 determines the permission and prohibition of driving the actuator 27. When the drive determination section 39 determines the prohibition of driving the actuator 27 (i.e., the permission of driving the actuator 27 is not determined), the first drive prohibition device 36A prohibits the actuator 27 from being driven.

The diagnosis section 45 of the transmission control circuit 44 of the AT-ECU 22 performs the fourth monitoring process. In the fourth monitoring process, the diagnosis section 45 performs abnormality diagnosis of the drive determination section 39 of the transmission control circuit 44 such as ROM check, RAM check, FLOW check, INST check and the like. Thereby, the diagnosis section 45 monitors whether or not the transmission control circuit 44 is normally operating.

When the diagnosis section 45 determines that the drive determination section 39 of the transmission control circuit 44 has abnormality (i.e., the drive determination section 39 is not normally operating), a fail-safe output section 46 outputs a fail-safe signal to place the automatic transmission 12 in a neutral state or to instruct the second drive prohibition device 36B to prohibit the actuator 27 from being driven.

In the fifth embodiment, the function of the drive determination section 39 is implemented in a control circuit (e.g., the transmission control circuit 44 of the AT-ECU 22) that is provided separately from the by-wire control circuit 34 of the SBW-ECU 23. Theretofore, even when the by-wire control circuit 34 has abnormality, the drive determination section 39 can normally determine the permission and prohibition of driving the actuator 27. Reliability of the drive determination section 39 improves.

In the above-illustrated fifth embodiment, the function of the drive determination section 39 is implemented in the transmission control circuit 44 of the AT-ECU 22. Alternatively, for example, the function of the drive determination section 39 may be implemented in a control circuit of the engine ECU 18. The fifth embodiment may also be provided with one of or both of the prohibition removal delay section 42 and the drivable delay section 43 illustrated in the third and fourth embodiments.

In each of the first, second, third, fourth and fifth embodiments, the drive determination section 39 determines the prohibition and permission of driving the actuator 27 based on the actual range signal, the range changeover request signal or the brake signal. However, this does not limit embodiments. For example, the drive determination section 39 determine the prohibition and permission of driving the actuator 27) based on ones of the following signals; the actual range signal; the range changeover request signal; the brake signal; a command range signal; a vehicle speed signal; an engine revolution speed signal; and an output signal of sensor for detecting whether the vehicle driver is seated (e.g., an output signal of a seating sensor, a door open signal).

In each of the first, second, third, fourth and fifth embodiments, the drive prohibition device 36 includes two separate devices (i.e., the first drive prohibition device 36A and the second drive prohibition device 36B). However, this does not limit embodiments. A single device may act as both of the first drive prohibition device 36A and the second drive prohibition device 36B. Additionally, the drive prohibition device 36 is not limited to the relay or the gate-off circuit. For example, the drive prohibition device 36 may include a device for mechanically locking the actuator 27 or the electric motor 29.

Additionally, in each of the first, second, third, fourth and fifth embodiments, a technical idea of the present disclosure is applied to the shift-by-wire system which controls the range switchover apparatus. However, this does not limit embodiments. For example, a technical idea of the present disclosure is applicable to various by-wire systems including a throttle-by-wire system, a steering-by-wire system, a brake-by-wire system (e.g., a main-brake-by-wire system, parking-brake-by-wire system), and the like.

Sixth Embodiment

A sixth embodiment will be described based on FIGS. 1, and 13 to 15. A schematic configuration of an automatic transmission control system of the sixth embodiment can be the same as that of the first embodiment illustrated in FIG. 1. Thus, explanation on the schematic configuration of an automatic transmission control system is omitted here.

Figure 14:
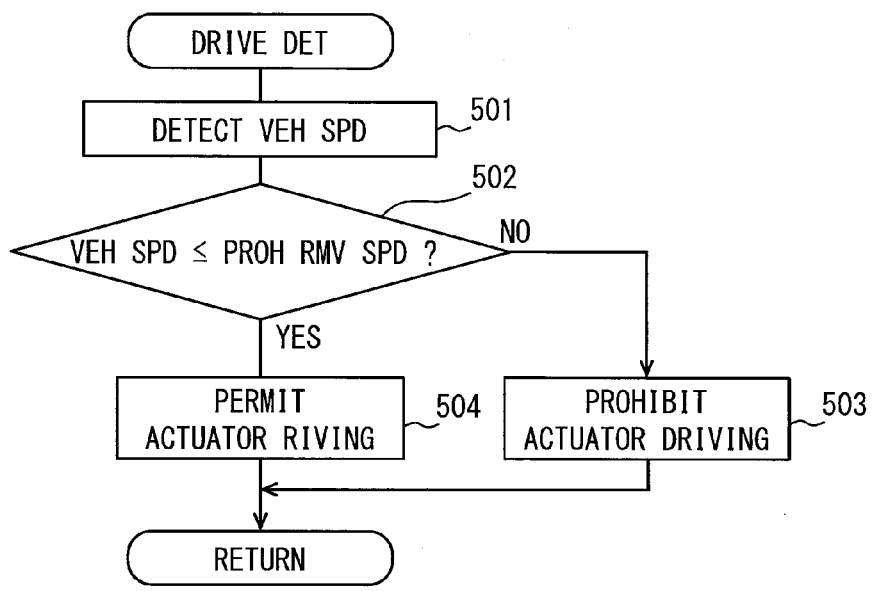
FIG. 14 is a flow chart illustrating a drive determination routine of the sixth embodiment.

The by-wire control circuit 34 of the SBW-ECU 23 executes a drive determination routine illustrated in FIG. 14 and determines the permission and prohibition of driving the actuator 27 based on the vehicle speed. When the permission of driving the actuator 27 is not determined, the drive prohibition device 36 prohibits the actuator from being driven. Furthermore, the monitor circuit 35 of the SBW-ECU 23 executes the monitor routine illustrated in FIG. 4 and monitors whether the by-wire control circuit 34 is normally operating. When it is determined that the by-wire control circuit 34 is not normally operating, the drive prohibition device 36 prohibits the actuator 27 from being driven.

Figure 13:
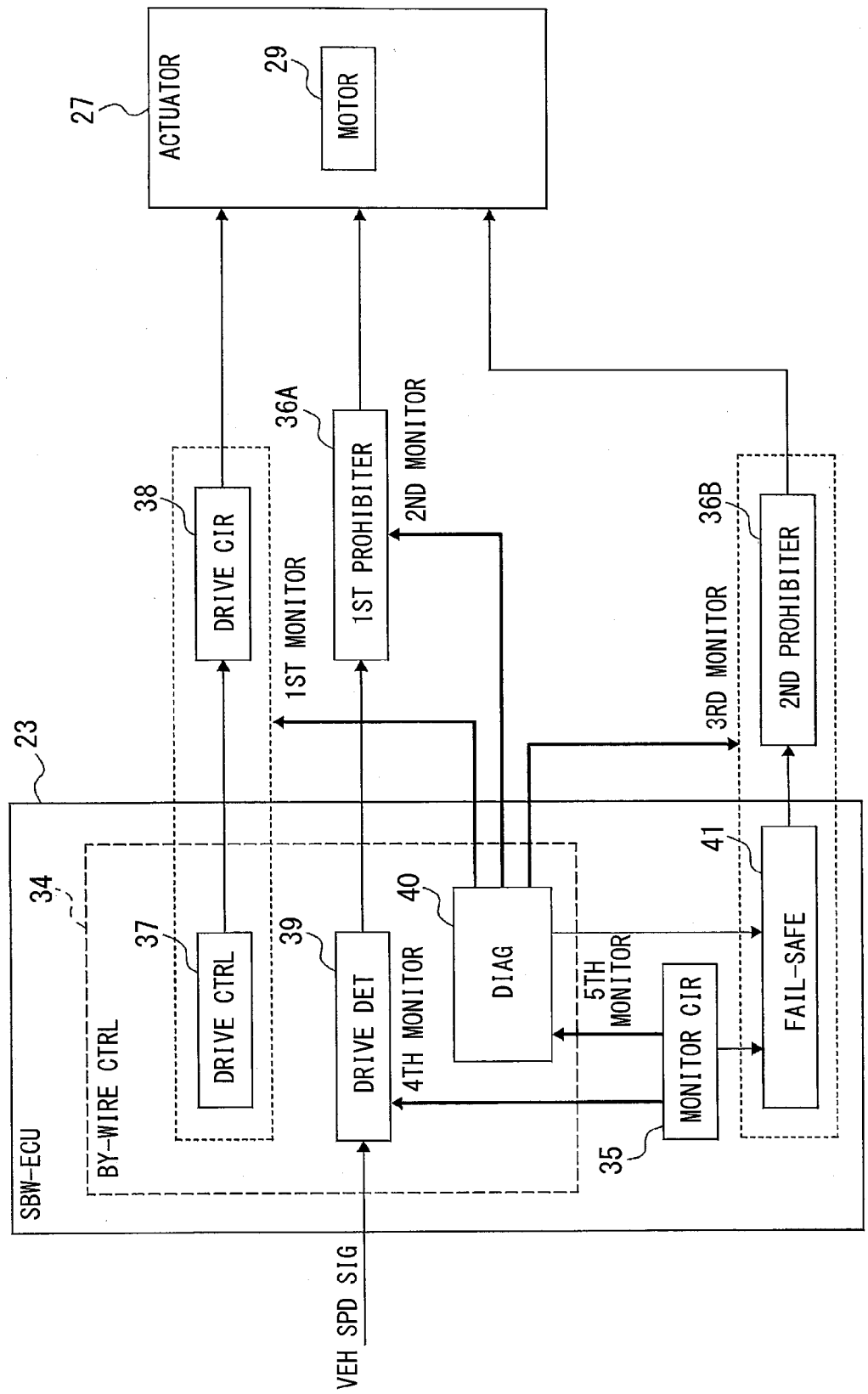
FIG. 13 is a block diagram for schematically explaining an actuator driving prohibition function of a sixth embodiment.

Specifically, as shown in FIG. 13, a drive control section 37 of the by-wire control circuit 34 of the SBW-ECU 23 controls the actuator 27 by controlling a drive circuit 38 controlling the power supply to the actuator 27 (e.g., electric motor 29).

The drive determination section 39 (corresponding to drive determination means) determines the permission and prohibition of driving the actuator 27 based on the vehicle speed. In general, when the vehicle is traveling with a relatively high speed, it is unnecessary to switchover a shift range using a range switchover apparatus 16. In this regard, the present embodiment detects the vehicle speed based on the vehicle speed signal outputted from the vehicle speed signal. When the vehicle speed is greater than a predetermined drive-prohibition removal speed (also called a predetermined threshold), the present embodiment determines the prohibition of driving the actuator 27. When the vehicle speed is less than or equal to the drive-prohibition removal speed, the present embodiment determines the permission of driving the actuator 27.

The drive-prohibition removal speed is set to an upper limit of the vehicle speed in which the switchover of the shift range by driving the actuator 27 does not generate the malfunction (e.g., the lock of the vehicle wheel, the damage of the automatic transmission 12, and the like). Alternatively, the drive-prohibition removal speed may be slightly smaller than the upper limit of the vehicle. Additionally, in some systems, a shift-switchover determination speed (see FIG. 15) may be set. In such cases, the drive-prohibition removal speed may be set to a value (e.g., 4 to 5 km/h), which is lightly larger than the shift-switchover determination speed (e.g., 2 to 3 km/h).

When the drive determination section 39 determines the prohibition of driving the actuator 27 (i.e., the permission of driving the actuator 27 is not determined), the drive determination section 39 outputs a drive prohibition signal, so that the first drive prohibition device 36A of the drive prohibition device 36 prohibits the actuator 27 from being driven.

The first drive prohibition device 36A includes a relay, which cuts off the power supply to the actuator 27 (e.g., electric motor 29) when the drive prohibition signal is inputted from the drive determination section 39. Alternatively, the first drive prohibition device 36A may include a gate-off circuit, which places a gate of a MOSFET of the drive circuit 38 in an off state (i.e., MOSFET for controlling the power supply to the electric motor 29) when the drive prohibition signal is inputted from the drive determination section 39. When the first drive prohibition device 36A includes hardware (e.g., the relay or the gate-off circuit) provided independently of the by-wire control circuit 34, the first drive prohibition device 36A is normally operable even in case of failure of the by-wire control circuit 34. Furthermore, if the first drive prohibition device 36A includes the relay, it is possible to suppress the power consumption by turning off the relay to cut off the power supply to the actuator 27.

When the drive determination section 39 determines the permission of driving the actuator 27, the drive determination section 39 outputs a drive permission signal, so that the actuator 27 is permitted to be driven. In other words, the prohibition of driving the actuator 27 by the first drive prohibition device 36A is removed.

The by-wire control circuit 34 includes a diagnosis section 40 for performing first, second and third monitoring processes. In the first monitoring process, when the vehicle speed is greater than the drive-prohibition removal speed (i.e., when the driving of the actuator 27 is prohibited), the diagnosis section 40 determines the presence of abnormality.

The diagnosis section 40 performs the second monitoring process in different ways depending on whether the first drive prohibition device 36A includes the relay or the gate-off circuit. In the case of the relay, when a terminal voltage of the electric motor 29 is a high level at a time of commanding the relay to be off, the diagnosis section 40 determines the presence of abnormality. In the case of the gate-off circuit, when the gate of the MOSFET is off state at a time of commanding the gate of the MOSFET to be on, the diagnosis section 40 determines the presence of abnormality. Additionally or alternatively, when a terminal voltage of the electric motor 29 is a low level at a time of commanding the electric-motor to be on, the diagnosis section 40 determines the presence of abnormality.

The diagnosis section 40 performs the third monitoring process in different ways depending on whether below-described second drive prohibition device 36B includes a relay or a gate-off circuit. In the case of the relay, when a terminal voltage of the electric motor 29 is a high level at a time of commanding the relay to be off, the diagnosis section 40 determines the presence of abnormality. In the case of the gate-off circuit, when the gate of the MOSFET is off state at a time of commanding the gate of the MOSFET to be on, the diagnosis section 40 determines the presence of abnormality. Additionally or alternatively, when a terminal voltage of the electric motor 29 is a low level at a time of commanding the electric motor 29 to be on, the diagnosis section 40 determines the presence of abnormality.

When the diagnosis section 40 determines the presence of abnormality in at least of the first, second and third monitoring processes, a fail-safe output section 41 outputs a fail-safe signal to a second drive prohibition device 36B of the drive prohibition device 36, so that the second drive prohibition device 36B prohibits the actuator 27 from being driven.

The second drive prohibition device 36B includes a relay, which cuts off (e.g., turns off) the power supply to the actuator 27 (e.g., electric motor 29) when the fail-safe signal is inputted from the fail-safe output section 41. Alternatively, the second drive prohibition device 36B may include a gate-off circuit, which places a gate of a MOSFET of the drive circuit 38 in an off state when the fail-safe signal is inputted from the fail-safe output section 41. Because the second drive prohibition device 36B includes hardware (e.g., the relay or the gate-off circuit) provided independently of the by-wire control circuit 34, the second drive prohibition device 36B is normally operable in case of failure of the by-wire control circuit 34. Furthermore, if the second drive prohibition device 36B includes the relay, it is possible to suppress the power consumption by turning off the relay to cut off the power supply to the actuator 27.

Furthermore, the monitor circuit 35, which is provided separately from the by-wire control circuit 34, performs fourth and fifth monitoring processes. In the fourth monitoring process, the monitor circuit 35 performs abnormality diagnosis of the drive determination section 39 of the by-wire control circuit 34 such as ROM check, RAM check, FLOW check, INST check and the like. Thereby, the monitor circuit 35 monitors whether or not the drive determination section 39 of the by-wire control circuit 34 is normally operating.

In the fifth monitoring process, the monitor circuit 35 performs abnormality diagnosis of the diagnosis section 40 of the by-wire control circuit 34 such as ROM check, RAM check, FLOW check, INST check and the like. Thereby, the monitor circuit 35 monitors whether or not the diagnosis section 40 of the by-wire control circuit 34 is normally operating.

When the monitor circuit 35 determines that the drive determination section 39 of the by-wire control circuit 34 has abnormality (i.e., the drive determination section 39 is not normally operating) or when the monitor circuit 35 determines that the diagnosis section 40 of the by-wire control circuit 34 has abnormality (i.e., the diagnosis section 40 is not normally operating), the fail-safe output section 41 outputs a fail-safe signal to the second drive prohibition device 36B of the drive prohibition device 36, so that the second drive prohibition device 36B prohibits the actuator 27 from being driven. In the following, the drive determination routine performed by the by-wire control circuit 34 of the SBW-ECU 23 will be described based on FIG. 15, and then, the monitoring process performed by the monitor circuit 35 of the by-wire control circuit 34 will be described based o FIG. 4.

(Drive Determination Routine)

During the power on of the SBW-ECU 23, the by-wire control circuit 34 of the SBW-ECU 23 repeatedly executes the drive determination routine illustrated in FIG. 14 at predetermined time intervals. When the drive determination routine starts, the by-wire control circuit 34 at S501 detects the vehicle speed signal outputted from the vehicle speed sensor 42. Thereafter, at S502, the by-wire control circuit 34 determines whether the vehicle speed is less than or equal to the drive-prohibition removal speed.

When it is determined at S502 that the vehicle speed is larger than the drive-prohibition removal speed, the process proceeds to S503. At S503, the by-wire control circuit 34 determines the prohibition of driving the actuator 27, and instructs the first drive prohibition device 36A to prohibit the actuator 27 from being driven.

When it is determined at S502 that the vehicle speed is less than or equal to the drive-prohibition removal speed, the process proceeds to S504. At S504, the by-wire control circuit 34 determines the permission of driving the actuator 27 to permit the actuator 27 to be driven (i.e., the prohibition of driving the actuator 27 by the first drive prohibition device 36A is removed).

(Monitoring Routine)

During the power on of the SBW-ECU 23, the monitor circuit 35 of the SBW-ECU 23 repeatedly executes the monitoring routine illustrated in FIG. 4 at predetermined time intervals. When the monitoring routine starts, the monitor circuit 35 monitors whether the by-wire control circuit 34 is normally operating at S201. In the above, the monitor circuit 35 performs abnormality diagnosis of the drive determination section 39 of the by-wire control circuit 34 such as ROM check, RAM check, FLOW check, INST check and the like. Thereby, the monitor circuit 35 monitors whether or not the drive determination section 39 of the by-wire control circuit 34 is normally operating. Furthermore, the monitor circuit 35 performs abnormality diagnosis of the diagnosis section 40 of the by-wire control circuit 34 such as ROM check, RAM check, FLOW check, INST check and the like. Thereby, the monitor circuit 35 monitors whether or not the diagnosis section 40 of the by-wire control circuit 34 is normally operating.

At S202, the monitor circuit 35 determines whether or not the by-wire control circuit 34 is normal, based on a result of the determination at S201. Specifically, the monitor circuit 35 determines whether or not both of the drive determination section 39 and the diagnosis section 40 are normally operating.

When it is determined at S202 that the by-wire control circuit 34 is normal (i.e., both of the drive determination section 39 and the diagnosis section 40 are normally operating), this monitoring routine is ended.

When it is determined at S202 that the by-wire control circuit 34 is not normal (i.e., at least one of the drive determination section 39 and the diagnosis section 40 is not normally operating), the process proceeds to S203. At S203, the monitor circuit 35 instructs the second drive prohibition device 36B to prohibit the actuator 27 from being driven.

In the above-illustrated sixth embodiment, the drive determination section 39 of the by-wire control circuit 34 determines the prohibition and permission of driving the actuator 27 based on the vehicle speed. When the permission of driving the actuator 27 is not determined (i.e., the prohibition of driving the actuator 27 is determined), the drive prohibition device 36 (specifically, the first drive prohibition device 36A) prohibits the actuator 27 from being driven. Additionally, the monitor circuit 35 provided separately from the by-wire control circuit 34 monitors whether the by-wire control circuit 34 is normally operating. When it is determined that the by-wire control circuit 34 is not normally operating, the drive prohibition device 36 (specifically, the second drive prohibition device 36B) prohibits the actuator 27 from being driven.

According to the above configuration, until the drive determination section 39 determines the permission of driving the actuator 27, the actuator 27 is prohibited from being driven even when the by-wire control circuit 34 is normal. Furthermore, if the monitor circuit 35 determines that the by-wire control circuit 34 is not normally operating, the actuator 27 is prohibited from being driven even when the drive determination section 39 determines the permission of driving the actuator 27. Accordingly, both of the by-wire control circuit 34 (specifically, the drive determination section 39) and the monitor circuit 35 can be used to prohibit the driving of the actuator 27. Therefore, unintentional switchover of shift range in case of system failure (e.g., generation of abnormal signals due to noise or source voltage decrease or the like) can be prevented. Safety improves.

Figure 15:
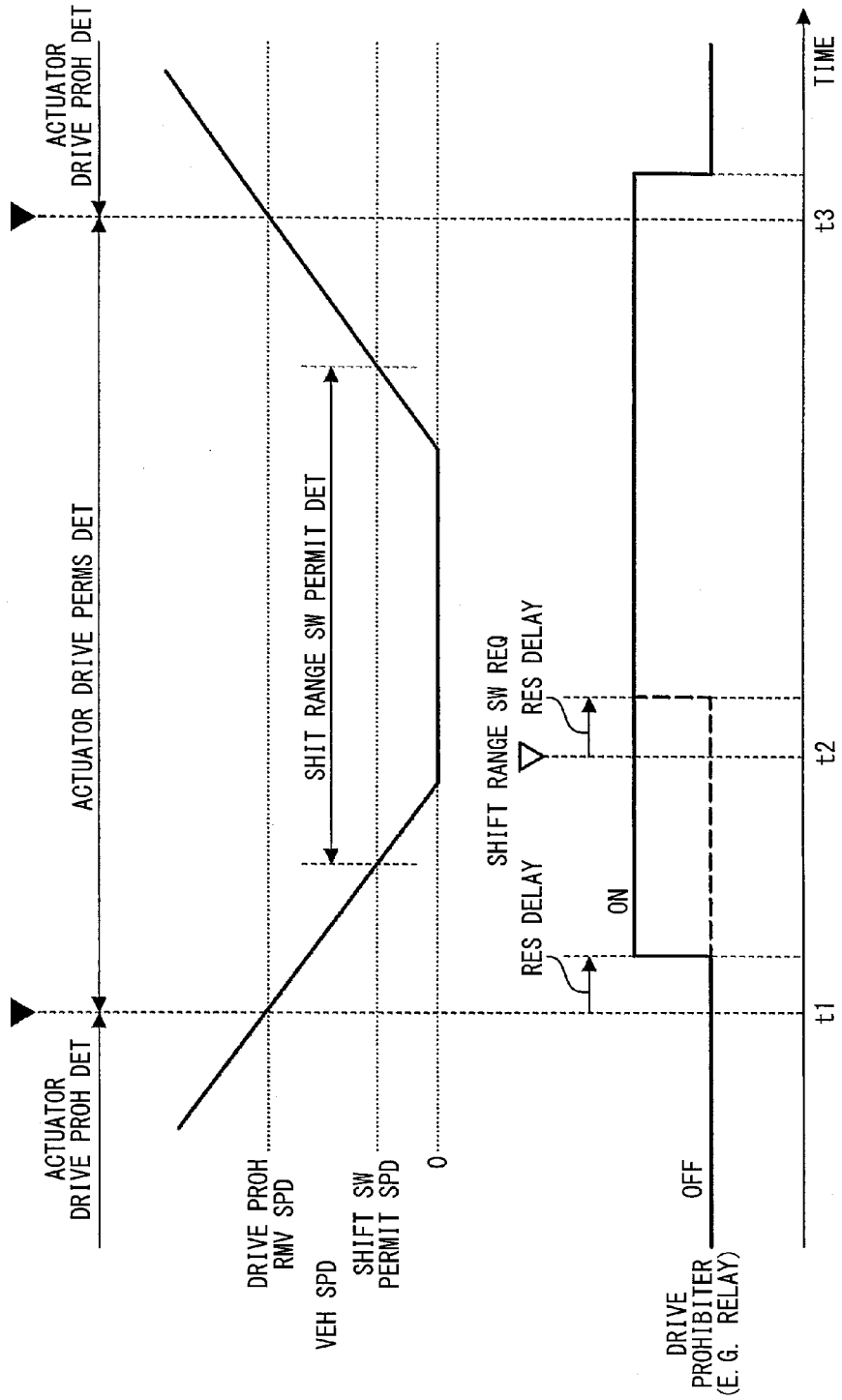
FIG. 15 is a timing chart illustrating an example of execution of drive determination process.

FIG. 15 is a time chart illustrating an example of determination as to driving the actuator 27 (i.e., determining the prohibition and permission of driving the actuator 27) according to the sixth embodiment. When the vehicle speed is larger than the drive-prohibition removal speed, the prohibition of driving the actuator 27 is determined, so that the first drive prohibition device 36A prohibits the actuator 27 from being driven. Thereafter, at a time when the vehicle speed decreases and reaches the drive-prohibition removal speed, the permission of driving the actuator 27 is determined, so that the prohibition of driving the actuator 27 by the first drive prohibition device 36A is removed. In the above, delay of response from the first drive prohibition device 36A (e.g., the relay) may cause the following time lag. The time lag is from a time when the permission of driving the actuator 27 is determined to a time when the prohibition of driving the actuator 27 is actually removed (i.e., a time when the actuator 27 is placed in the drivable state).

Explanation on this time lag will specifically be given for a system of the present embodiment and a comparative example. As illustrated by the dashed-line in FIG. 15, in the system of comparative example, after the permission of driving the actuator 27 is determined at a time t2 when the shift range switchover request from the vehicle driver is generated, the prohibition of driving the actuator 27 by the first drive prohibition device 36A is removed. Because of this, the delay of response from the first drive prohibition device 36A (e.g., the relay) creates a time lag between a time when the shift range switchover request from the vehicle driver is generated and a time when the prohibition of driving the actuator 27 is actually removed and the switchover of the shift range starts (e.g., the actuator 27 starts being driven).

By contrast, in the present embodiment, at a time t1 when the vehicle speed becomes less than or equal to the drive-prohibition removal speed before the shift range switchover request from the vehicle driver is generated, the permission of driving the actuator 27 is determined and the prohibition of driving the actuator 27 by the first drive prohibition device 36A is removed. Therefore, before the shift range switchover request from the vehicle driver is generated, the prohibition of driving the actuator 27 is removed. Accordingly, it is possible to switch over the shift range (e.g., drive the actuator 27) in response to a vehicle driver's shift range switchover request in an improved response manner. Gear shift feeling improves.

Thereafter, at a time t3 when the vehicle speed increases and becomes larger than the drive-prohibition removal speed, the prohibition of driving the actuator 27 is determined and the prohibition of driving the actuator 27 by the first drive prohibition device 36A is set up. Therefore, when the vehicle speed is in the speed range in which the switching over of the shift range by the driving of the actuator 27 may cause malfunction, unintentional switchover of the shift range can be prevented.

Furthermore, in the present embodiment, the drive prohibition device 36 (including the first and second drive prohibition devices 36A, 36B) is configured as hardware (e.g., relay or gate-off circuit) independent of the by-wire control circuit 34, so that even in case of failure of the by-wire control circuit 34, the drive prohibition device 36 is normally operable. Therefore, even in case of failure of the by-wire control circuit 34, the drive prohibition device 36 can normally operate to prohibit the actuator 27 from Furthermore, in the present embodiment, a function of the drive determination section 39 is implemented in the by-wire control circuit 34 of the SBW-ECU 23. Therefore, in order to implement a technical idea of the present embodiment, the specification or the like of a control circuit (e.g., a control circuit of the engine ECU 18, a control circuit of the AT-ECU 22) different from the by-wire control circuit 34 is not necessary. In order to implement a technical idea of the present embodiment, it may be sufficient to change the specification or the like of the by-wire control circuit 34. Therefore, it is easily to implement a technical idea of the present embodiment.

Seventh Embodiment

A seventh embodiment will be described based on FIG. 16. It is noted that explanation on substantially the same parts as in the sixth embodiment may be omitted or simplified, and explanation on parts different from the sixth embodiment will be mainly given below.

Figure 16:
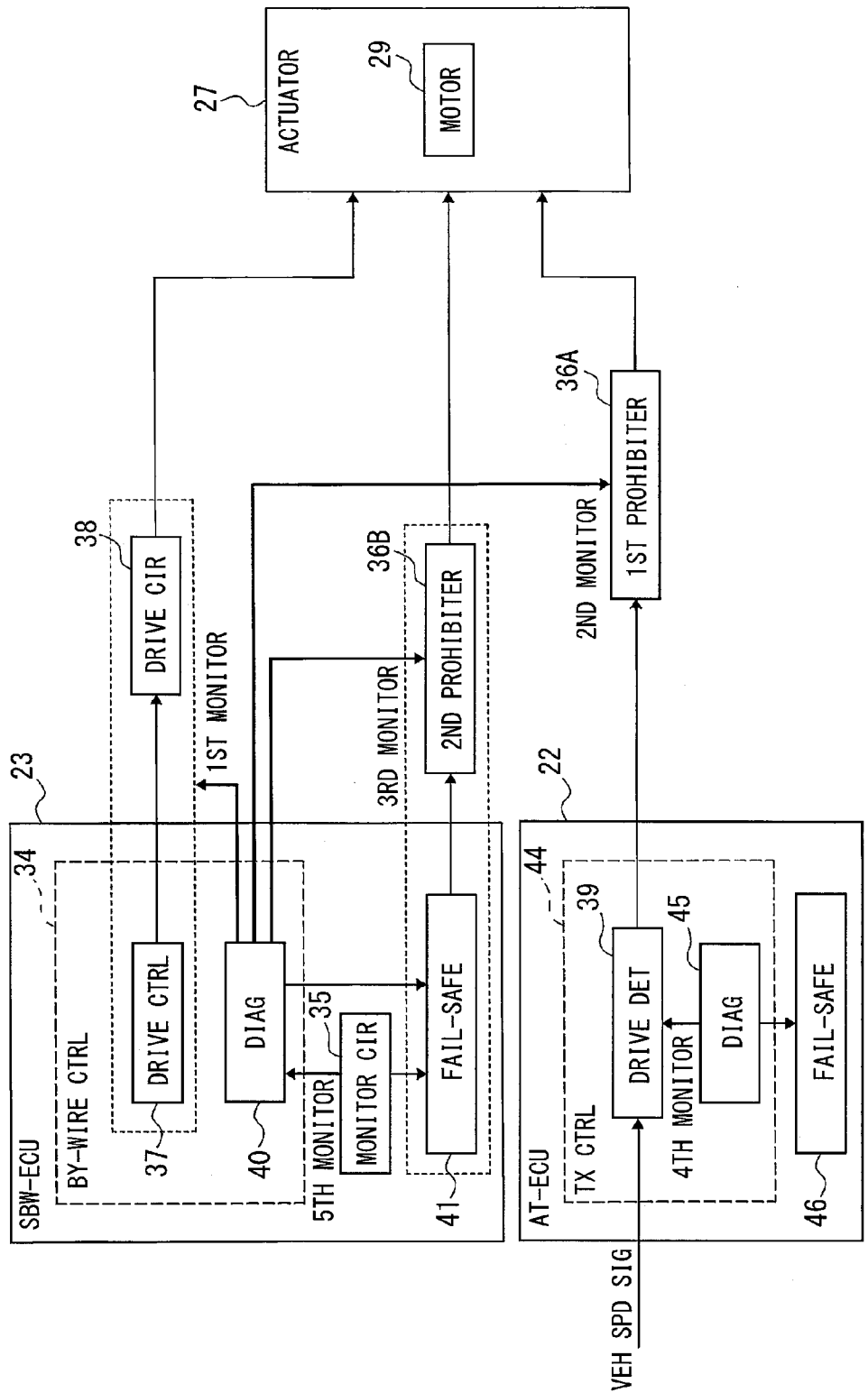
FIG. 16 is a block diagram for schematically explaining an actuator driving prohibition function of a seventh embodiment.

In the seventh embodiment, as shown in FIG. 16, a function of the drive determination section 39 is implemented in a control circuit that is provided separately from the by-wire control circuit 34 of the SBW-ECU 23. Specifically, a function of the drive determination section 39 is implemented in a transmission control circuit 44 of the AT-ECU 22. The drive determination section 39 of the transmission control circuit 44 of the AT-ECU 22 determines the permission and prohibition of driving the actuator 27 based on the vehicle speed. When the drive determination section 39 determines the prohibition of driving the actuator 27 (i.e., the permission of driving the actuator 27 is not determined), the first drive prohibition device 36A prohibits the actuator 27 from being driven.

The diagnosis section 45 of the transmission control circuit 44 of the AT-ECU 22 performs the fourth monitoring process. In the fourth monitoring process, the diagnosis section 45 performs abnormality diagnosis of the drive determination section 39 of the transmission control circuit 44 such as ROM check, RAM check, FLOW check, INST check and the like. Thereby, the diagnosis section 45 monitors whether or not the transmission control circuit 44 is normally operating.

When the diagnosis section 45 determines that the drive determination section 39 of the transmission control circuit 44 has abnormality (e.g., the drive determination section 39 is not normally operating), the fail-safe output section 41 outputs a fail-safe signal to place the automatic transmission 12 in a neutral state or to instruct the second drive prohibition device 36B to prohibit the actuator 27 from being driven.

In the seventh embodiment, the function of the drive determination section 39 is implemented in a control circuit (e.g., the transmission control circuit 44 of the AT-ECU 22) that is provided separately from the by-wire control circuit 34 of the SBW-ECU 23. Therefore, even when the by-wire control circuit 34 has abnormality, the drive determination section 39 can normally determine the permission and prohibition of driving the actuator 27. Reliability of the drive determination section 39 improves.

In the above-illustrated seventh embodiment, the function of the drive determination section 39 is implemented in the transmission control circuit 44 of the AT-ECU 22. However, this does not limit embodiments. For example, the function of the drive determination section 39 may be implemented in a control circuit of the engine ECU 18.

In the sixth and seventh embodiments, the vehicle speed is detected based on an output signal (e.g., vehicle speed signal) of the vehicle speed sensor 42. However, this does not limit embodiments. For example, the vehicle speed may be estimated or calculated based on at least one of: an output signal (e.g., brake signal) of a brake switch (e.g., brake sensor) for detecting ON/OFF of the brake or a brake operation amount; a signal (e.g., engine revolution speed signal) depending on an engine revolution speed; a vehicle position signal calculated in a navigation apparatus; a signal (e.g., gear position signal) depending on a gear position (e.g., gear ratio) of the automatic transmission 12; or the like. This enables high accuracy vehicle speed estimation and facilitates determining whether or not the vehicle speed is less than or equal to the drive-prohibition removal speed.

In the sixth and seventh embodiments, the drive prohibition device 36 includes two separate devices (i.e., the first drive prohibition device 36A and the second drive prohibition device 36B). However, this does not limit embodiments. A single device may act as both of the first drive prohibition device 36A and the second drive prohibition device 36B. Additionally, the drive prohibition device 36 is not limited to the relay or the gate-off circuit. For example, the drive prohibition device 36 may include a device for mechanically locking the actuator 27 or the electric motor 29.

Additionally, in each of the sixth and seventh embodiments, a technical idea of the present disclosure is applied to the shift-by-wire system which controls the range switchover apparatus. However, this does not limit embodiments. For example, a technical idea of the present disclosure is applicable to various by-wire systems including a throttle-by-wire system, a steering-by-wire system, a brake-by-wire system (e.g., a main-brake-by-wire system, parking-brake-by-wire system), and the like.

The present disclosure is not limited the above embodiments and modifications thereof. That is, the above embodiments and modifications thereof may be modified in various ways without departing from the sprit and scope of the present disclosure. For example, the present disclosure also includes embodiments, configurations, and modes that may result from an appropriate combination of the technical portions disclosed in different embodiments, configurations, and modes.

What is claimed is:

1. An actuator control apparatus comprising:
   a by-wire control circuit for electrically controlling an actuator, which is a drive source of an on-board apparatus mounted to a vehicle;
   a monitor circuit for monitoring whether or not the by-wire control circuit is normally operating, wherein the monitor circuit is provided separately from the by-wire control circuit;
   a drive determination section for determining prohibition and permission of driving the actuator; and
   a prohibition section
      for prohibiting the actuator from being driven when the permission of driving the actuator is not determined by the drive determination section, and
      for prohibiting the actuator from being driven when the monitor circuit determines that the by-wire control circuit is not normally operating, wherein:
   after the by-wire control circuit starts up, the by-wire control circuit executes an initial learning process, in which the by-wire control circuit drives the actuator to learn information that is used to control the actuator; and
   when a brake is on, the drive determination section permits execution of the initial learning process;
   when the drive determination section permits the execution of the initial learning process, the drive determination section determines the permission of driving the actuator.

2. The actuator control apparatus according to claim 1, wherein:
   based on a plurality of signals representing a state of the vehicle, the drive determination section determines the prohibition and permission of driving the actuator.

3. The actuator control apparatus according to claim 1, wherein:
   even when the by-wire control circuit has abnormality, the prohibition section is normally operable.

4. The actuator control apparatus according to claim 1, wherein:
   after the by-wire control circuit starts up, the drive determination section permits the execution of the initial learning process only once.

5. The actuator control apparatus according to claim 1, wherein:
   even when the brake becomes off during the execution of the initial learning process, the drive determination section permits the execution of the initial learning process at least until finish of the initial learning process.

6. The actuator control apparatus according to claim 1, wherein:
   the drive determination section is implemented in the by-wire control circuit.

7. The actuator control apparatus according to claim 1, wherein:
   the drive determination section is implemented in a control circuit that is provided separately from the by-wire control circuit.

8. The actuator control apparatus according to claim 1, wherein:
   the on-board apparatus includes a range switchover apparatus, which switches over a shift range among a plurality of ranges using the actuator as the drive source of the range switchover apparatus.

9. An actuator control apparatus comprising:
   a by-wire control circuit for electrically controlling an actuator, which is a drive source of an on-board apparatus mounted to a vehicle;
   a monitor circuit for monitoring whether or not the by-wire control circuit is normally operating, wherein the monitor circuit is provided separately from the by-wire control circuit;
   a drive determination section for determining prohibition and permission of driving the actuator; and
   a prohibition section
      for prohibiting the actuator from being driven when the permission of driving the actuator is not determined by the drive determination section, and
      for prohibiting the actuator from being driven when the monitor circuit determines that the by-wire control circuit is not normally operating; wherein:
   when the drive determination section determines the prohibition of driving the actuator and thereafter determines the permission of driving the actuator, the drive determination section determines removal of the prohibition of driving the actuator; and
   the actuator control apparatus further comprises a prohibition removal delay section for removing the prohibition, which is executed by the prohibition section, of driving the actuator after elapse of a predetermined delay time period since the drive determination section determined the removal of the prohibition of prohibiting driving the actuator.

10. An actuator control apparatus comprising:
    a by-wire control circuit for electrically controlling an actuator, which is a drive source of an on-board apparatus mounted to a vehicle;
    a monitor circuit for monitoring whether or not the by-wire control circuit is normally operating, wherein the monitor circuit is provided separately from the by-wire control circuit;
    a drive determination section for determining prohibition and permission of driving the actuator; and
    a prohibition section
       for prohibiting the actuator from being driven when the permission of driving the actuator is not determined by the drive determination section, and
       for prohibiting the actuator from being driven when the monitor circuit determines that the by-wire control circuit is not normally operating; wherein:
    when the drive determination section determines the prohibition of driving the actuator and thereafter determines the permission of driving the actuator, the drive determination section determines removal of the prohibition of driving the actuator; and the actuator control apparatus further comprises a drivable delay section for placing the actuator in a drivable state after elapse of a predetermined delay time period since the drive determination section determined the removal of the prohibition of driving the actuator.

11. An actuator control apparatus comprising:
a by-wire control circuit for electrically controlling an actuator, which is a drive source of an on-board apparatus mounted to a vehicle;
a monitor circuit for monitoring whether or not the by-wire control circuit is normally operating, wherein the monitor circuit is provided separately from the by-wire control circuit;
a drive determination section
for determining prohibition of driving the actuator when speed of the vehicle is greater than a threshold, and
for determining permission of driving the actuator when the speed of the vehicle is less than or equal to the threshold; and
a prohibition section
for prohibiting the actuator from being driven when the permission of driving the actuator is not determined by the drive determination section, and
for prohibiting the actuator from being driven when the monitor circuit determines that the by-wire control circuit is not normally operating.

12. The actuator control apparatus according to claim 11, wherein:
the drive determination section estimates the speed of the vehicle based on at least one of a vehicle speed signal, a brake signal, an engine revolution signal, a vehicle position signal or a gear position signal.

13. The actuator control apparatus according to claim 11, wherein:
even when the by-wire control circuit has abnormality, the prohibition section is normally operable.

14. The actuator control apparatus according to claim 11, wherein:
the drive determination section is implemented in the by-wire control circuit.

15. The actuator control apparatus according to claim 11, wherein:
the drive determination section is implemented in a control circuit that is provided separately from the by-wire control circuit.

\* \* \* \* \*